United States Patent

Otani et al.

(10) Patent No.: US 8,760,768 B2
(45) Date of Patent: *Jun. 24, 2014

(54) OPTICAL PROJECTION SYSTEM AND PROJECTOR INCLUDING THE SAME

(75) Inventors: Makoto Otani, Matsumoto (JP); Eiji Morikuni, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 101 days.

This patent is subject to a terminal disclaimer.

(21) Appl. No.: 13/529,439

(22) Filed: Jun. 21, 2012

(65) Prior Publication Data

US 2013/0010370 A1    Jan. 10, 2013

(30) Foreign Application Priority Data

Jul. 4, 2011    (JP) ................................. 2011-148000

(51) Int. Cl.
| | |
|---|---|
| G02B 13/08 | (2006.01) |
| G02B 3/00 | (2006.01) |
| G03B 3/00 | (2006.01) |
| G02B 13/16 | (2006.01) |

(52) U.S. Cl.
CPC ............... *G02B 13/08* (2013.01); *G02B 13/16* (2013.01); *G02B 21/142* (2013.01)
USPC ........................... 359/668; 359/649; 353/101

(58) Field of Classification Search
USPC ............ 359/432, 668–677, 738–740; 353/76, 353/97, 100, 101, 119, 121, 122, 30, 37, 38, 353/77, 78, 88, 94, 98, 99; 348/743–747, 348/602, E9.027
See application file for complete search history.

(56) References Cited

U.S. PATENT DOCUMENTS

| | | | |
|---|---|---|---|
| 5,671,993 A * | 9/1997 | Shikama | 353/77 |
| 6,829,111 B2 * | 12/2004 | Fujisawa et al. | 359/822 |
| 7,095,563 B2 * | 8/2006 | Nurishi | 359/668 |
| 7,113,344 B2 | 9/2006 | Nurishi et al. | |
| 7,580,601 B2 | 8/2009 | Katsuma et al. | |

(Continued)

FOREIGN PATENT DOCUMENTS

| | | |
|---|---|---|
| JP | A-06-043362 | 2/1994 |
| JP | A-2005-221597 | 8/2005 |
| JP | A-2005-300928 | 10/2005 |
| JP | A-2008-511018 | 4/2008 |
| JP | A-2011-107312 | 6/2011 |
| WO | WO 2006/023276 A1 | 3/2006 |

OTHER PUBLICATIONS

Office Action dated Jan. 3, 2014 issued in U.S. Appl. No. 13/529,444.

*Primary Examiner* — Thomas K Pham
*Assistant Examiner* — Nicholas Pasko
(74) *Attorney, Agent, or Firm* — Oliff PLC

(57) ABSTRACT

An optical modulation device side lens group has different powers in the longitudinal direction and the lateral direction of a liquid crystal panel. Therefore, as the entire system of the optical projection system, the optical modulation device side lens group has different magnification in the longitudinal and lateral directions. Therefore, it is possible to make the aspect ratio of an image of the liquid crystal panel different from the aspect ratio of an image projected on a screen. That is, conversion can be performed on an aspect ratio. At this time, a distance p between each focus or a diaphragm and the screen SC side end surface of the optical modulation device side lens group satisfies the conditional expressions, so it is possible to achieve a predetermined or higher telecentricity in both states, that is, a first operating state and a second operating state.

20 Claims, 17 Drawing Sheets

(56) References Cited

U.S. PATENT DOCUMENTS

| | | |
|---|---|---|
| 2005/0168829 A1 | 8/2005 | Nurishi et al. |
| 2007/0253076 A1* | 11/2007 | Takaura et al. ............... 359/780 |
| 2009/0303607 A1 | 12/2009 | Inoue et al. |
| 2009/0303608 A1 | 12/2009 | Schauss |
| 2011/0115946 A1 | 5/2011 | Saruwatari |
| 2012/0320347 A1* | 12/2012 | Morikuni et al. ............. 353/101 |
| 2012/0327372 A1* | 12/2012 | Otani et al. ..................... 353/31 |
| 2013/0010371 A1* | 1/2013 | Otani et al. ................... 359/668 |
| 2013/0027676 A1* | 1/2013 | Otani et al. ..................... 353/97 |
| 2013/0229633 A1* | 9/2013 | Hirata et al. .................... 353/70 |

* cited by examiner

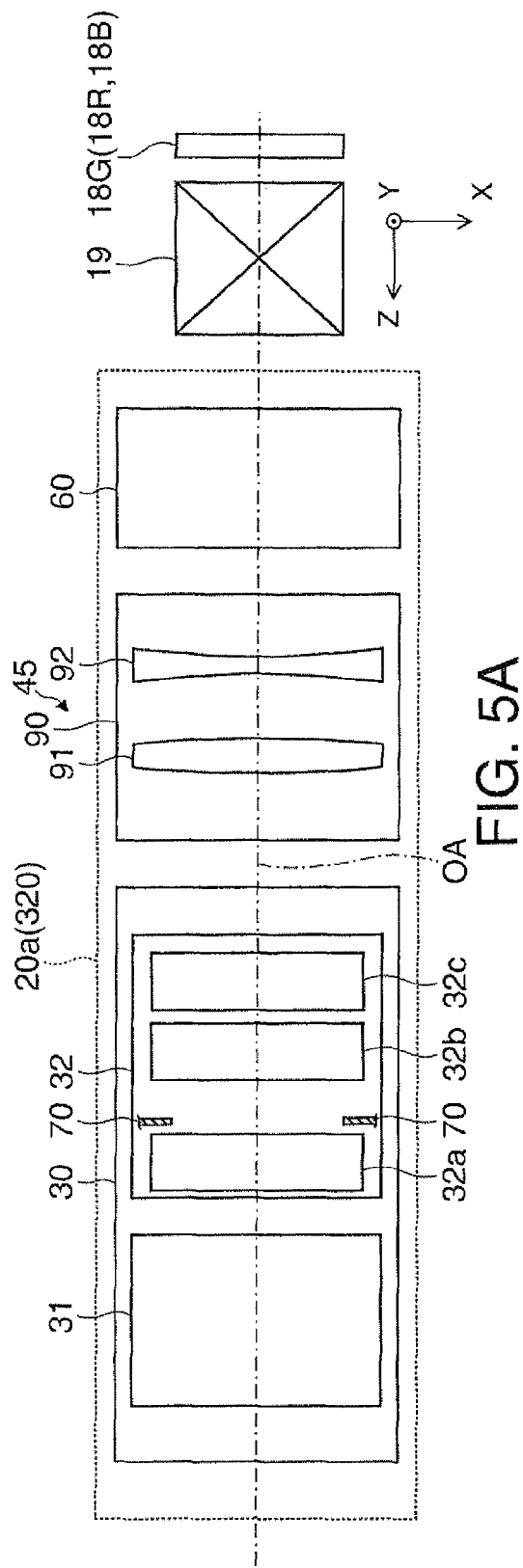
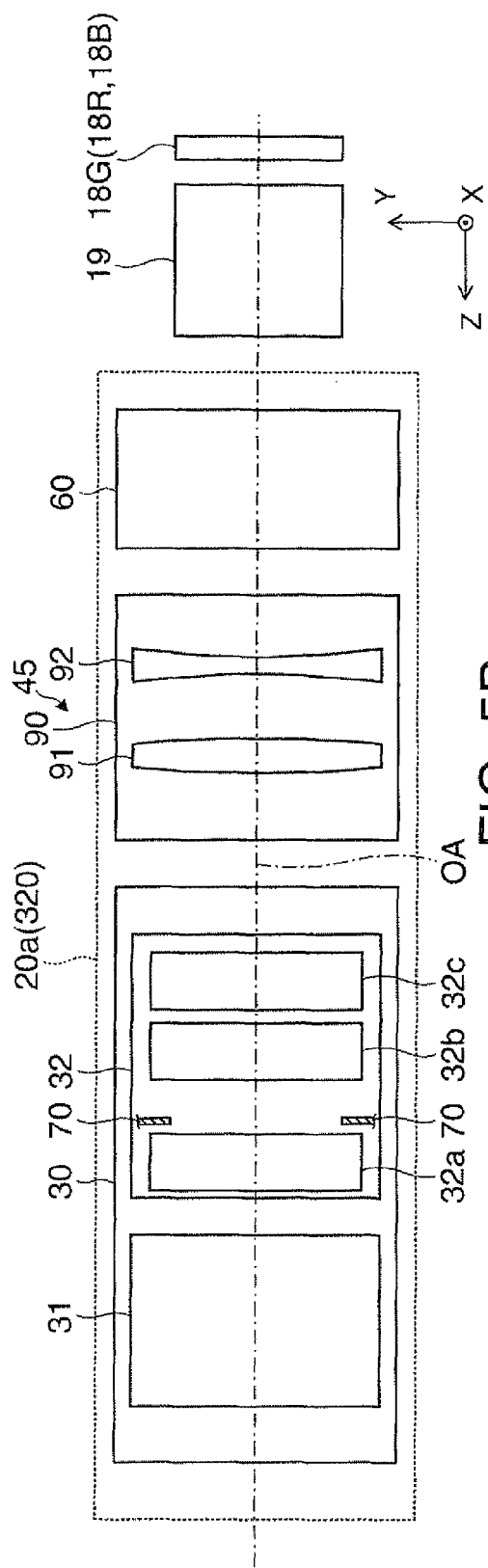
FIG. 5A
FIG. 5B

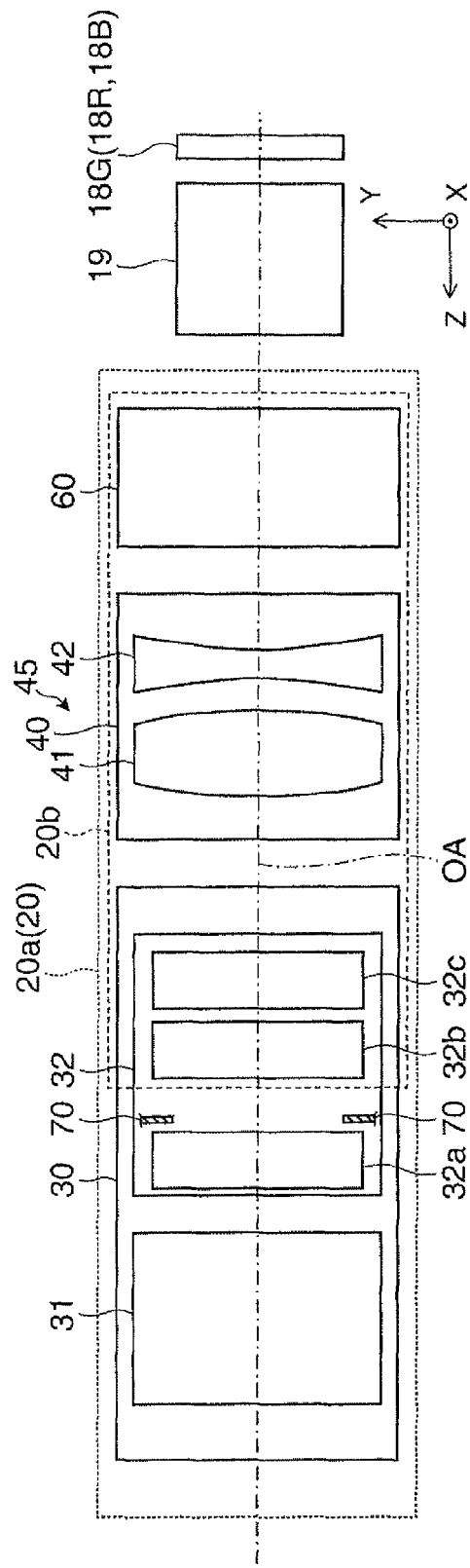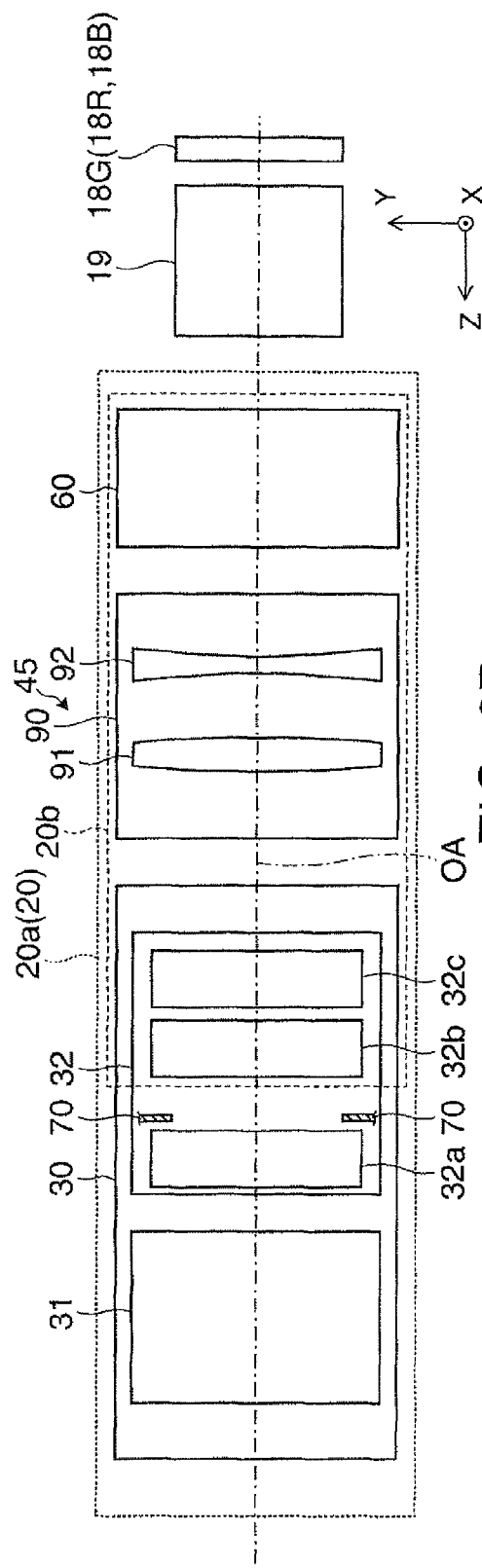

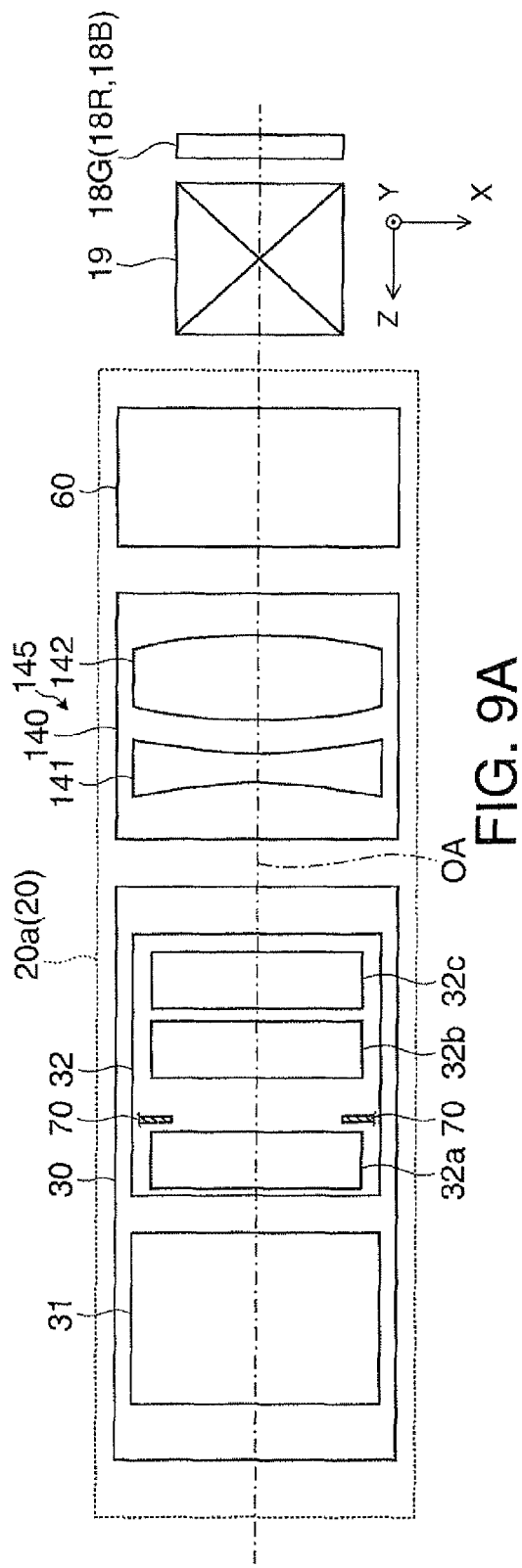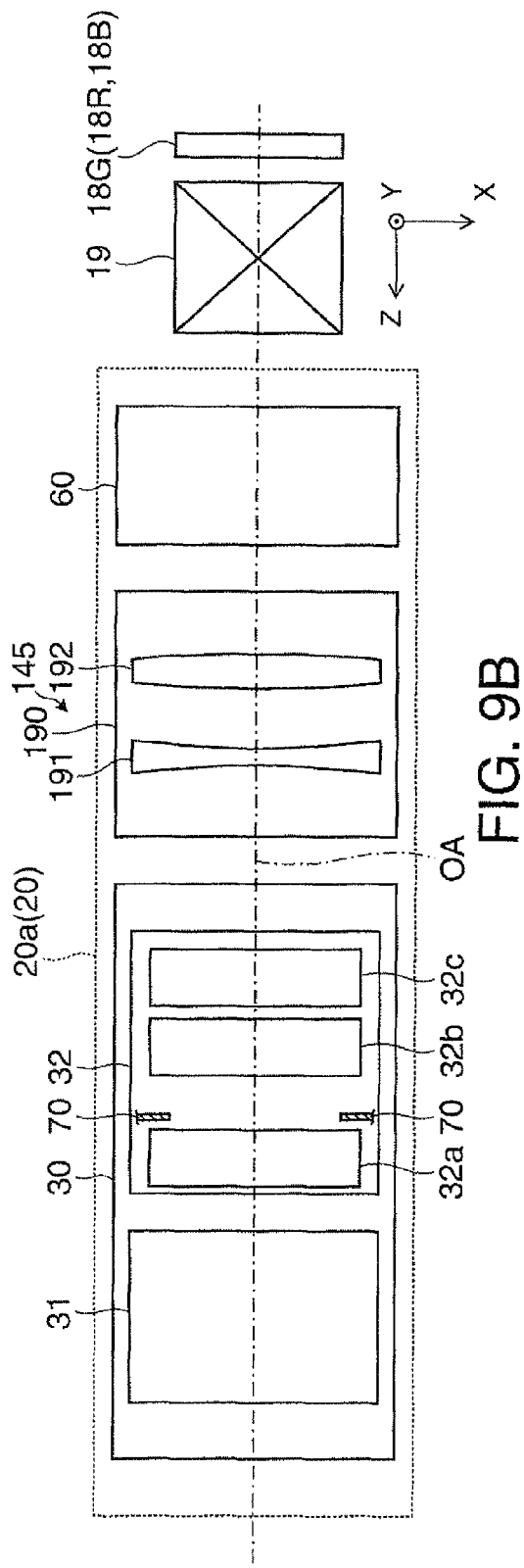

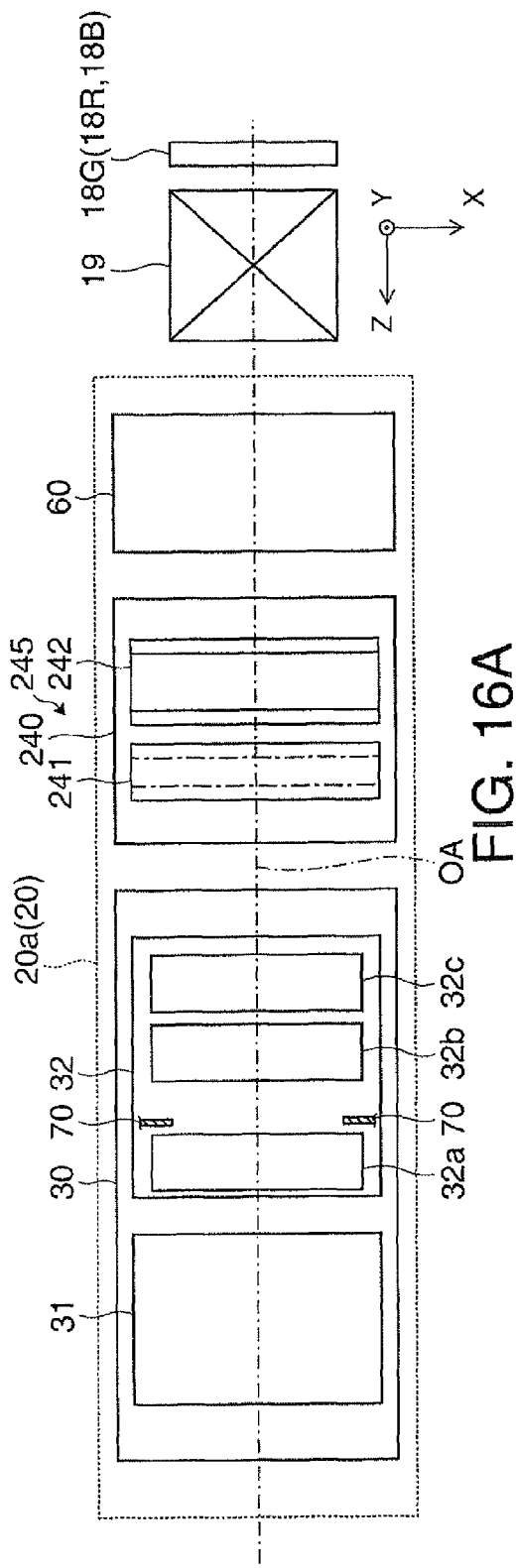
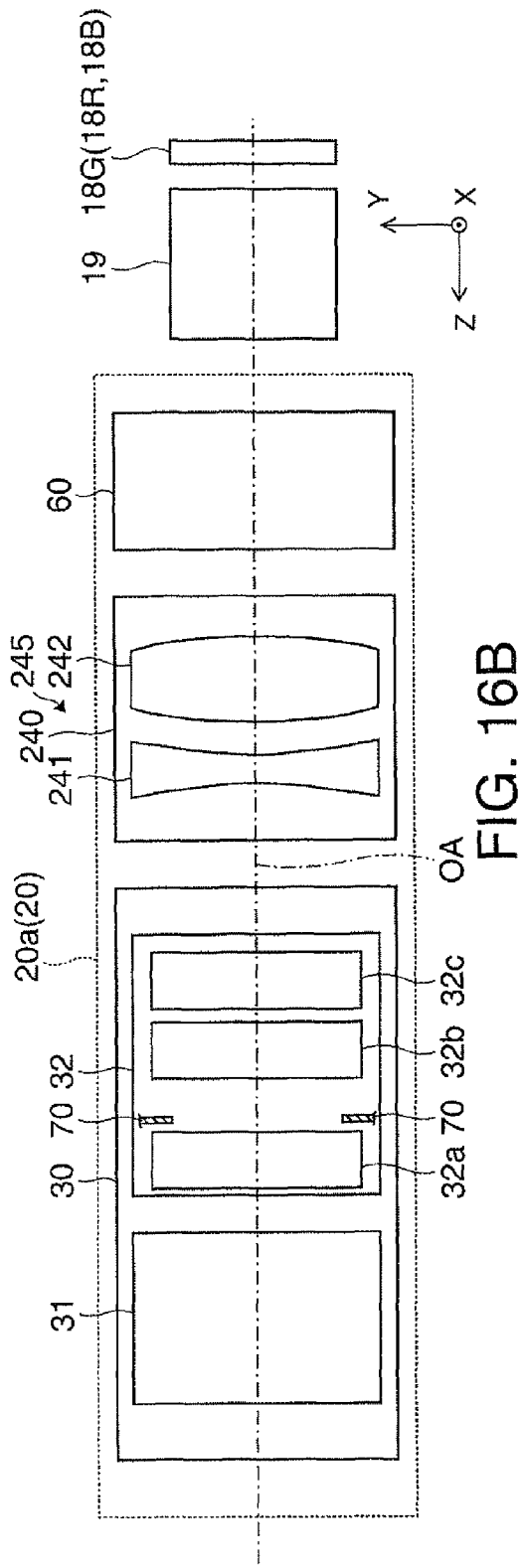
FIG. 16A
FIG. 16B

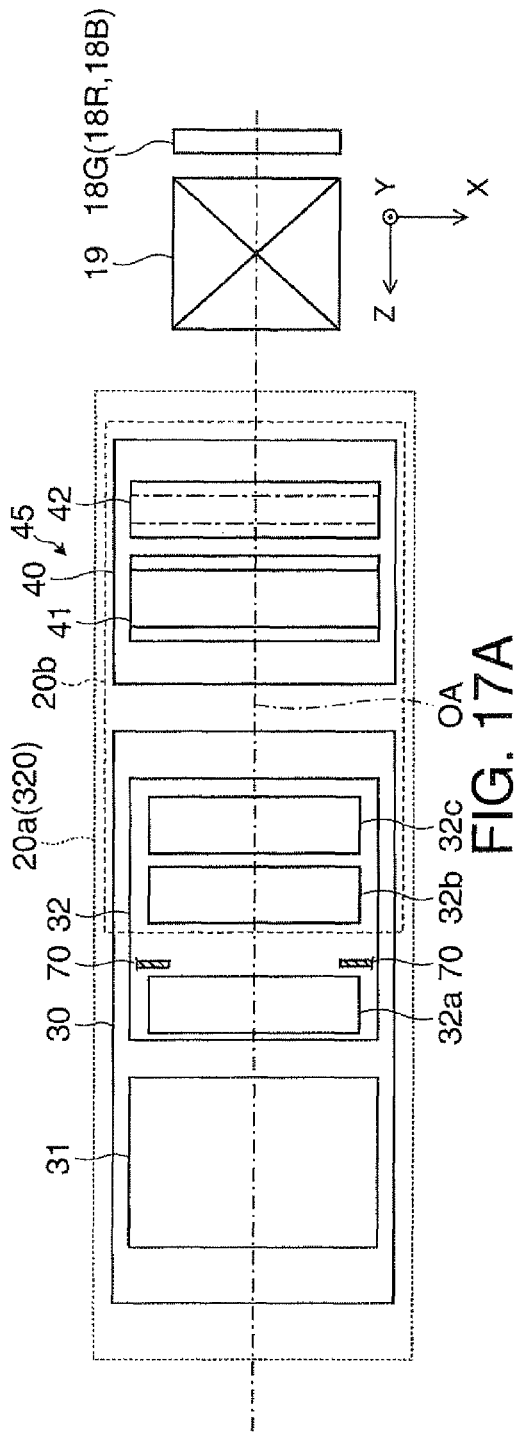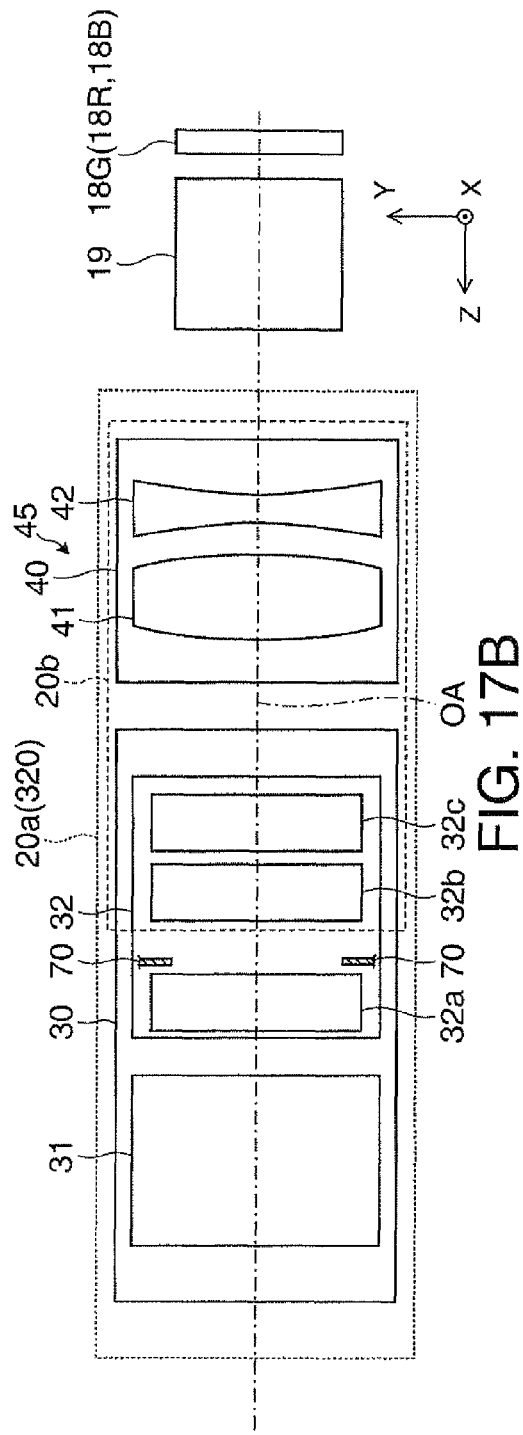

OPTICAL PROJECTION SYSTEM AND PROJECTOR INCLUDING THE SAME

BACKGROUND

1. Technical Field

The present invention relates to an optical projection system, which can perform conversion of the aspect ratio of a projected image, and a projector including the same.

2. Related Art

As a converter for aspect ratio conversion, which is used for the optical projection system of a projector, there is a front arrangement-type converter which is arranged to advance and retract in the front of an optical projection system in the related art, that is, in the front of an image side.

However, this type of converter is provided as an external optical section which is independent from the projector main body, causes an increase in the size of the projector, complicates the adjustment of the whole optical projection system including the converter, or badly degrades an image.

In addition, instead of the optical projection system of the projector, as a converter for aspect ratio conversion used in an imaging optical system, such as a camera, there is a rear arrangement-type relay system which is detachably arranged on the image side of an image forming optical system (refer to JP-A-2005-221597 and JP-A-2005-300928). This relay system includes a first group, a second group, and a third group. Among them, the intermediate second group is an anamorphic converter, and can be inserted into or retracted from between the first group and the third group.

However, the relay system or the anamorphic converter disclosed in JP-A-2005-221597 or the like is used in an imaging optical system. If the relay system or the anamorphic converter is used in an optical projection system as it is, various types of restriction occur.

For example, in the case of the above-described rear arrangement-type relay system, telecentricity is not considered. In such a relay system, in principle it is difficult to achieve both telecentricity of a lateral section and telecentricity of a longitudinal section. Therefore, if telecentricity is precisely secured in one direction of an X section and a Y section, telecentricity is greatly degraded in the remaining direction, so that the usage efficiency of light deteriorates or is biased according to the direction.

Further, in the imaging optical system disclosed in JP-A-2005-221597, it is fundamentally assumed that lenses can be replaced. When a rear arrangement-type relay system is not used, an image forming optical system is directly fixed to an imaging section and independently used. Therefore, in the case of maintaining the performance of the image forming optical system, there is a problem in that the length of the rear arrangement-type relay system becomes long. Meanwhile, lenses are not generally replaced in an optical projection system, so that a function as a general-purpose relay system or a general-purpose converter, in which various types of interchangeable lenses can be mounted, is not necessary.

SUMMARY

An advantage of some aspects of the invention is to provide an optical projection system, which increases the usage efficiency of light in a balanced manner, and a projector including the optical projection system.

An aspect of the invention is directed to an optical projection system which, when an image is enlarged and projected on a surface to be projected, makes the aspect ratio of an image of an optical modulation device different from the aspect ratio of the image projected on the surface to be projected, the optical projection system including a diaphragm which restricts the passage of light flux; and an optical modulation device side lens group which is arranged between the optical modulation device and the diaphragm, configured to include an adjustment optical device group which has different powers in the longitudinal direction and the lateral direction of the optical modulation device and which is capable of advancing and retracting on an optical path, and a rotationally symmetric lens group which includes one or more rotationally symmetrical lenses, which have the same power in the longitudinal direction and the lateral direction of the optical modulation device and which is capable of advancing and retracting on the optical path. When one of the adjustment optical device group and the rotationally symmetric lens group of the optical modulation device side lens group is arranged on an optical path, a remaining group is withdrawn from the optical path, so that a state in which the adjustment optical device group is on the optical path can be interchanged with a state in which the rotationally symmetric lens group is on the optical path. When it is assumed that a distance between the focus on the side of the surface to be projected and an end surface on the side of the surface to be projected is set to "FFPx" in the lateral section of the optical modulation device side lens group in the state in which the adjustment optical device group is arranged on the optical path, a distance between the focus on the side of the surface to be projected and the end surface on the side of the surface to be projected is set to "FFPy" in the longitudinal section of the optical modulation device side lens group in the state in which the adjustment optical device group is arranged on the optical path, and a distance between the focus on the side of the surface to be projected and the end surface on the side of the surface to be projected is set to "FFPL" in the optical modulation device side lens group in the state in which the rotationally symmetrical lens group is arranged on the optical path, FFPx, FFPy, and FFPL satisfy the following expressions, $$\text{if } FFPx < FFPy, FFPx < FFPL < FFPy \qquad (1), \text{ and}$$

$$\text{if } FFPy < FFPx, FFPy < FFPL < FFPx \qquad (1)'.$$

In the optical projection system, the adjustment optical device group can be advanced and retracted on the optical path, and the rotationally symmetric lens group can be inserted instead of the adjustment optical device group. Further, in the first operating state in which the adjustment optical device group is on the optical path and projection is performed by performing conversion of an aspect ratio, focus distances can differ in the longitudinal direction and the lateral direction, magnifications can differ in the longitudinal direction and the lateral direction, and the aspect ratio of the image of the optical modulation device can be different from the aspect ratio of an image to be projected on the surface to be projected. That is, it is possible to perform conversion of an aspect ratio which is the ratio of width to height using the optical projection system. Further, in the second operating state in which the rotationally symmetric lens group is on the optical path instead of the adjustment optical device group and projection is performed without performing conversion of an aspect ratio, it is possible to make the aspect ratio of the image of the optical modulation device equal to the aspect ratio of the image to be projected on the surface to be projected. That is, the ratio of width to height can be maintained as it is using the optical projection system without performing conversion of the ratio of width to height. At this time, in the second operating state in which projection is performed without performing conversion of an aspect ratio by arranging the rotationally symmetric lens group on the optical path instead of the adjustment optical device group, the distance FFPL satisfies the conditional expressions (1) and (1)', that is, the distance FFPL is between the distance FFPx and the distance FFPy, so that it is possible to maintain comparatively high telecentricity in the second operating state as well as it is possible to maintain comparatively high telecentricity in the first operating state.

In one specific aspect of the invention, in the optical projection system, when it is assumed that a distance between the diaphragm and the end surface on the side of the surface to be projected in the optical modulation device side lens group is "p" in the state in which the adjustment optical device group is arranged on the optical path, p may satisfy the following expressions, $$\text{if } FFPx < FFPy, FFPx < p < FFPy \quad (2) \text{ and}$$

$$\text{if } FFPy < FFPx, FFPy < p < FFPx \quad (2)'.$$

In this case, the distance p, between the diaphragm and the end surface on the side of the surface to be projected in the optical modulation device side lens group, satisfies the above-described Conditional expressions (2) and (2)' in the first operating state in which the adjustment optical device group is arranged on the optical path, and conversion is performed on the aspect ratio and then projection is performed, so that it is possible to secure a predetermined or higher telecentricity in both the longitudinal direction and the lateral direction. For example, if FFPx<p<FFPy, principal rays in the longitudinal direction slope inward for the surface to be projected and principal rays in the lateral direction slope outward for the surface to be projected. However, telecentricity is maintained as a whole. On the contrary, if FFPy<p<FFPx, principal rays in the longitudinal direction slope outward for the surface to be projected, and principal rays in the lateral direction slope inward for the surface to be projected. However, telecentricity is maintained as a whole.

In one specific aspect of the invention, in the optical projection system, the distance p, between the diaphragm and the end surface on the side of the surface to be projected in the optical modulation device side lens group, may be substantially equal to the distance FFPL between the focus on the side of the surface to be projected in the optical modulation device side lens group and the end surface on the side of the surface to be projected in the state in which the adjustment optical device group is withdrawn from the optical path. In this case, an appropriate state can be set in order to implement telecentricity.

In one specific aspect of the invention, in the optical projection system, $$\text{if } FFPx < FFPy, FFPx < p(FFPy + FFPx)/2 \quad (3) \text{ and}$$

$$\text{if } FFPy < FFPx, FFPy < p(FFPy + FFPx)/2 \quad (3)'.$$

In this case, it is possible to make telecentricity comparatively high in the intermediate direction between the lateral direction and the longitudinal direction, it is possible to reduce the directional bias of telecentricity, and it is possible to project a bright image in which it is difficult to cause unevenness depending on the direction of observation.

In one specific aspect of the invention, the optical projection system further substantially includes, in order from the side of the surface to be projected, a first group which performs enlargement; a second group which includes the adjustment optical device group and the rotationally symmetric lens group which are alternatively arranged on the optical path; and a third group having positive power. In this case, the adjustment optical device group and the rotationally symmetric lens group, which are the second group, can be replaced at a position that is close to the optical modulation device, and the ray of each image height passes through the second group along a path which is comparatively close to the image height, so that it is easy to control rays. Therefore, it is possible to restrain the occurrence of aberration because of the replacement operation of the adjustment optical device group and the rotationally symmetric lens group, which are the second group. That is, it is possible to restrain the occurrence of aberration by placing the second group at a position that is close to the optical modulation device. Further, it is possible to restrain the spread of light which is emitted from the optical modulation device because the third group has positive power. Therefore, the angle of light which is incident on the second group is small, so that the second group can be compact while the occurrence of the aberration which occurs in the second group is restrained. Therefore, it can be expected that a highly precise lens process is performed, performance can be improved, and costs can be reduced.

In one specific aspect of the invention, the optical projection system further substantially includes, in order from the side of the surface to be projected, a first group which performs enlargement; and a second group which includes the adjustment optical device group and the rotationally symmetric lens group which are alternatively arranged on the optical path. In this case, the adjustment optical device group and the rotationally symmetric lens group, which are the second group, can be replaced at a position where is close to the optical modulation device, and the ray of each image height passes through the second group along the path which is comparatively close to the image height, so that it is easy to control rays. Therefore, it is possible to restrain the occurrence of aberration attributable to the replacement operation of the adjustment optical device group and the rotationally symmetric lens group, which are the second group. That is, by placing the second group at a position where is close to the optical modulation device, it is possible to restrain the occurrence of aberration while reducing the size of the second group. Therefore, it can be expected that a highly precise lens process is performed, performance is improved, and cost can be reduced.

In one specific aspect of the invention, the adjustment optical device group includes, in order from the side of the surface to be projected, a first optical device group having positive power and a second optical device group having negative power in the section of the longitudinal direction of the optical modulation device. In this case, it is possible to compress or reduce an image to be projected on the surface to be projected in the longitudinal direction.

In one specific aspect of the invention, the rotationally symmetric lens group corresponds to each of the optical device groups of the adjustment optical device group, and includes, in order from the side of the surface to be projected, a first optical device group having positive power and a second optical device group having negative power. In this case, positive and negative powers are all together in the rotationally symmetric lens group and the second group, so that it is possible to perform adjustment such that the power of each of the optical device groups of the rotationally symmetric lens group comparatively easily and accurately becomes a desired state.

In one specific aspect of the invention, the adjustment optical device group includes, in order from the side of the surface to be projected, a first optical device group having negative power and a second optical device group having positive power in the section of the lateral direction of the optical modulation device. In this case, an image to be projected on the surface to be projected can be expanded or enlarged in the lateral direction.

In one specific aspect of the invention, the rotationally symmetric lens group corresponds to each of the optical device groups of the adjustment optical device group, and includes, in order from the side of the surface to be projected, a first optical device group having negative power and a second optical device group having positive power. In this case, positive and negative powers are all together in the rotationally symmetric lens group and the second group, so that it is possible to perform adjustment such that the power of each of the optical device groups of the rotationally symmetric lens group comparatively easily and accurately becomes a desired state.

In one specific aspect of the invention, the rotationally symmetric lens group has power which ranges between the power of the adjustment optical device group in the section of the longitudinal direction of the optical modulation device and the power in the section of the lateral direction. In this case, for example, by making the state of the rotationally symmetric lens group an intermediate state of the power in the longitudinal direction and the lateral direction of the adjustment optical device group, it is possible to position a focus in the second operating state at a substantially intermediate position of a focus in the first operating state. For example, the value of FFPL can substantially be an average value between FFPx and FFPy.

In one specific aspect of the invention, the optical projection system further includes a photonic synthesis prism which is arranged in the optical modulation device side of the optical modulation device side lens group. In this case, it is possible to synthesize and project a plurality of colors of images formed on a plurality of optical modulation devices.

Another aspect of the invention is directed to a projector including the optical projection system and the optical modulation device. According to the projector, it is possible to project an image, which has an aspect ratio which is different from the aspect ratio of the image of the optical modulation device, on the surface to be projected. At this time, it is possible to project a bright image in which it is difficult to cause unevenness depending on the direction of observation using a particular optical projection system.

BRIEF DESCRIPTION OF THE DRAWINGS

The invention will be described with reference to the accompanying drawings, wherein like numbers reference like elements.

FIG. 5A is a view illustrating the configuration of the lateral section of the optical projection system in the second operating state, and FIG. 5B is a view illustrating the configuration of the longitudinal section of the optical projection system in the second operating state.

FIG. 6A is a view illustrating the first operating state of the optical projection system, and FIG. 6B is a view illustrating the second operating state of the optical projection system.

FIG. 9A is a view illustrating the configuration of a lateral section in the first operating state of the optical projection system shown in FIG. 3A or the like according to a modification example, and FIG. 9B is a view illustrating the configuration of a lateral section in the second operating state.

FIG. 16A is a view illustrating the configuration of the lateral section in the first operating state of the optical projection system of a projector according to a second embodiment, and FIG. 16B is a view illustrating the configuration of the longitudinal section in the first operating state of the optical projection system.

FIG. 17A is a view illustrating the configuration of the lateral section in the first operating state of the optical projection system of a projector according to a third embodiment, and FIG. 17B is a view illustrating the configuration of the longitudinal section in the first operating state of the optical projection system.

DESCRIPTION OF EXEMPLARY EMBODIMENTS

A projector and an optical projection system according to an embodiment of the invention will be described in detail with reference to the accompanying drawings.

First Embodiment

Figure 1:
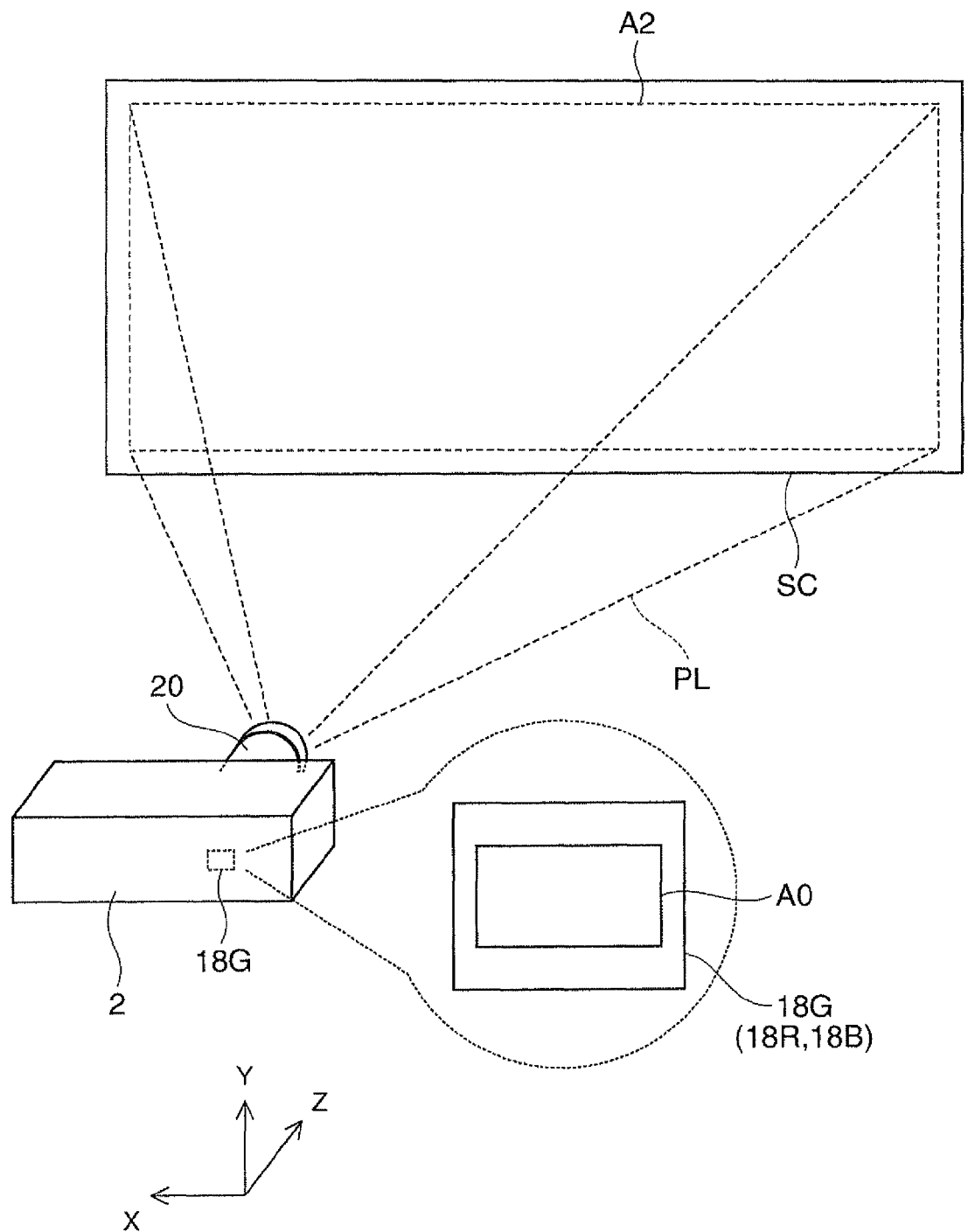
FIG. 1 is a perspective view illustrating the usage state of a projector according to a first embodiment.

As shown in FIG. 1, a projector 2 according to a first embodiment of the invention forms image light PL in response to an image signal, and projects the corresponding image light PL on a surface to be projected, such as a screen SC. When the image of a liquid crystal panel 18G (18R, 18B), which is an optical modulation device embedded in the projector 2, is enlarged and then projected on the screen (the surface to be projected) SC, the optical projection system 20 of the projector 2 can make the aspect ratio AR0 of the image of the liquid crystal panel 18G (18R, 18B) different from the aspect ratio AR2 of an image to be projected on the screen SC. That is, although the aspect ratio AR0 of the display region A0 of the liquid crystal panel 18G can be different from the aspect ratio AR2 of the display region A2 of the screen SC, the aspect ratio AR0 of the display region A0 of the liquid crystal panel 18G can be the same as the aspect ratio AR2 of the display region A2 of the screen SC. In detail, the aspect ratio AR0 of the display region A0 of the liquid crystal panel 18G is, for example, 1.78:1, and the aspect ratio AR2 of the display region A2 of the screen SC is, for example, 1.78:1, 1.85:1, 2.35:1, 2.4:1, or the like.

Figure 2:
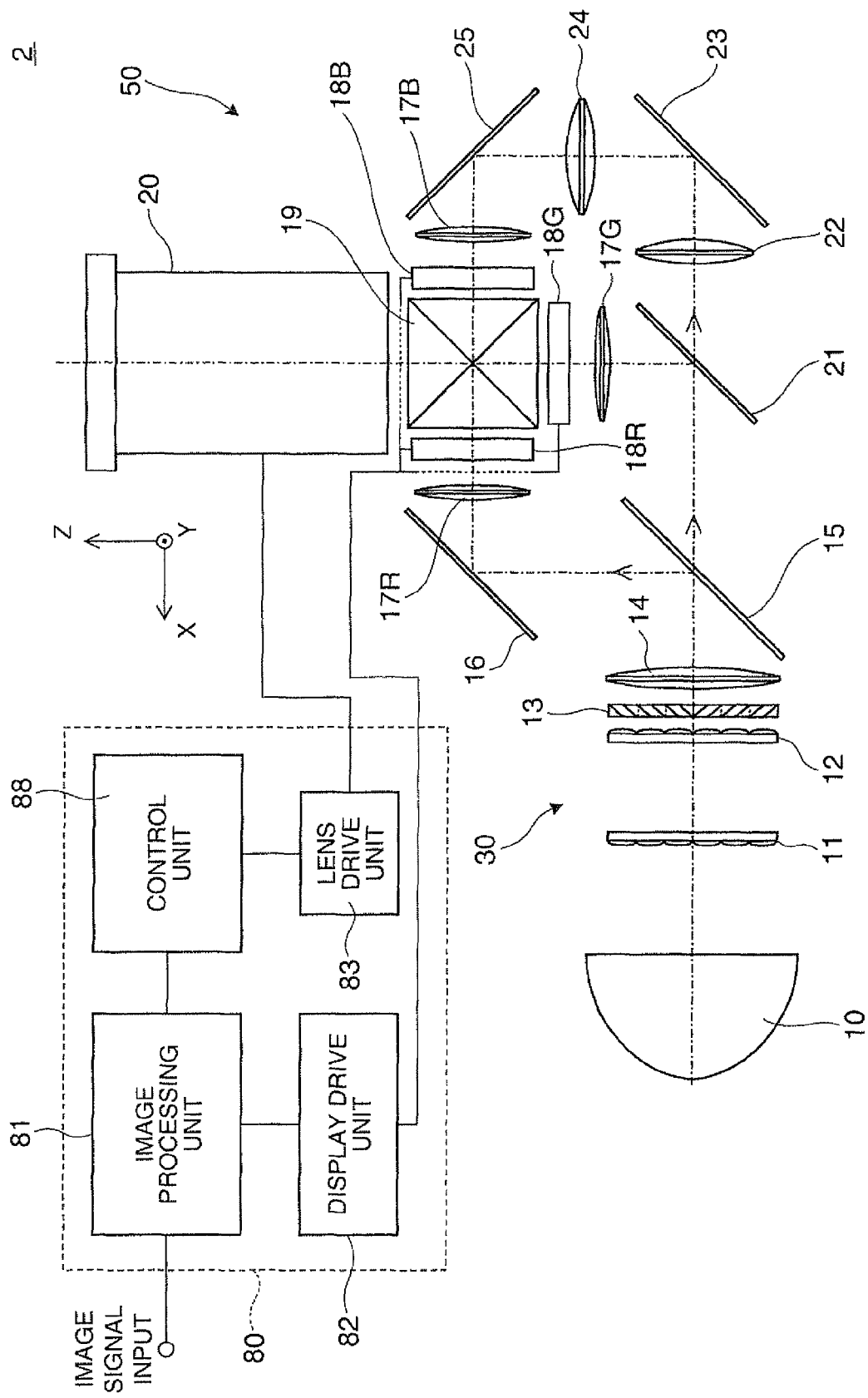
FIG. 2 is a view illustrating the schematic configuration of the projector shown in FIG. 1.

As shown in FIG. 2, the projector 2 includes an optical system section 50 which projects image light and a circuit apparatus 80 which controls the operation of the optical system section 50.

The light source 10 of the optical system section 50 is, for example, an extra high pressure mercury lamp, and emits light including R light, G light, and B light. Here, the light source 10 may be a discharge light source other than the extra high pressure mercury lamp, and may be a solid light source, such as an LED (Light Emitting Diode) or laser. Each of a first integrator lens 11 and a second integrator lens 12 includes a plurality of lens devices which are arranged in an array. The first integrator lens 11 divides light flux received from the light source 10 into a plurality of pieces of light flux. Each of the lens devices of the first integrator lens 11 performs light condensing on the light flux received from the light source 10 in the vicinity of the lens devices of the second integrator lens 12. The lens devices of the second integrator lens 12 form the image of the lens devices of the first integrator lens 11 on the liquid crystal panels 18R, 18G, and 18B in cooperation with a superimposed lens 14. With the above-described configuration, the light from the light source 10 illuminates the whole display region (display region A0 in FIG. 1) of the liquid crystal panels 18R, 18G, and 18B with substantially uniform brightness.

A polarized conversion device 13 converts light from the second integrator lens 12 into predetermined linear polarized light. The superimposed lens 14 superimposes the images of the respective lens devices of the first integrator lens 11 on the display region of the liquid crystal panels 18R, 18G, and 18B via the second integrator lens 12.

A first dichroic mirror 15 reflects the R light which is incident from the superimposed lens 14, and passes the G light and the B light. The R light reflected by the first dichroic mirror 15 is incident on the liquid crystal panel 18R, which is the optical modulation device, via a reflection mirror 16 and a field lens 17R. The liquid crystal panel 18R forms an R-color image by modulating the R light in response to the image signal.

A second dichroic mirror 21 reflects the G light received from the first dichroic mirror 15, and passes the B light. The G light reflected by the second dichroic mirror 21 is incident on the liquid crystal panel 18G, which is the optical modulation device, via a field lens 17G. The liquid crystal panel 18G forms a G-color image by modulating G light in response to the image signal. The B light, which passed through the second dichroic mirror 21, is incident on the liquid crystal panel 18B, which is the optical modulation device, via relay lenses 22 and 24, reflection mirrors 23 and 25, and a field lens 17B. The liquid crystal panel 18B forms a B-color image by modulating the B light in response to the image signal.

A cross dichroic prism 19 is a prism for photonic synthesis. The cross dichroic prism 19 synthesizes pieces of light modulated in the respective liquid crystal panels 18R, 18G, and 18B, makes the resulting light as image light, and then progresses the resulting light to the optical projection system 20.

The optical projection system 20 enlarges and projects the image light PL, which is modulated by the liquid crystal panels 18G, 18R, and 18B and then synthesized by the cross dichroic prism 19, on the screen SC in FIG. 1. At this time, the optical projection system 20 can make the aspect ratio AR2 of the image projected on the screen SC different from the aspect ratio AR0 of the image of the liquid crystal panels 18G, 18R, and 18B, or can make the aspect ratio AR2 the same as the aspect ratio AR0.

The circuit apparatus 80 includes an image processing unit 81 to which an external image signal, such as a video signal, is input, a display drive unit 82 which drives the liquid crystal panels 18G, 18R, and 18B provided in the optical system section 50 based on the output of the image processing unit 81, a lens drive unit 83 which adjusts the state of the optical projection system 20 by operating drive mechanism (not shown) provided in the optical projection system 20, and a main control unit 88 which generally controls the operation of the circuit sections 81, 82, and 83.

The image processing unit 81 converts the input external image signal into an image signal including the grayscale or the like of each color. In the case of a first operating state in which the optical projection system 20 performs conversion of the aspect ratio of an image and then projects the image, the image processing unit 81 performs conversion in advance on the aspect ratio of an image, obtained by reversing the conversion of the aspect ratio performed by the optical projection system 20, thereby preventing the image displayed on the screen SC from being expanded and contracted in the longitudinal and lateral direction. In detail, when an image is expanded by the optical projection system 20 in the lateral direction to be in the range, for example, from 1.78:1 to 2.4:1, the image is compressed in advance in the lateral direction by 0.742=1.78/2.4 times or the image is expanded in the longitudinal direction by 1.35=2.4/1.78 times. Meanwhile, in the case of a second operating state in which the optical projection system 20 does not perform conversion of the aspect ratio or the aspect ratio of the image and projects the image, the image processing unit 81 does not perform conversion of the aspect ratio of the image as described above. In addition, the image processing unit 81 can perform various types of image processes, such as distortion correction or color correction, on the external image signal.

The display drive unit 82 can operate the liquid crystal panels 18G, 18R, and 18B based on the image signal output from the image processing unit 81, and can form an image corresponding to the relevant image signal or an image corresponding to a signal, obtained by performing an image process on the image signal, on the liquid crystal panels 18G, 18R, and 18E.

The lens drive unit 83 operates under the control of the main control unit 88, and can change the projection magnification of the image on the screen SC in FIG. 1 using the optical projection system 20 by, for example, appropriately moving a partial optical device including a diaphragm included in the optical projection system 20 along an optical axis OA. Further, the lens drive unit 83 can change the aspect ratio AR2 of the image which is projected on the screen SC in FIG. 1 by advancing and retracting additional the partial optical device, included in the optical projection system 20, on an optical axis OA, that is, on an optical path. The lens drive unit 83 can change the longitudinal position of the image which is projected on the screen SC in FIG. 1 by performing adjustment which causes the whole optical projection system 20 to be moved in the vertical direction which is perpendicular to the optical axis OA.

Hereinafter, the optical projection system 20 according to the first embodiment will be described with reference to FIG. 3A. The optical projection system 20 includes a main body section 20a which is configured by combining a plurality of optical devices, such as lenses, and drive mechanisms 61, 62, 63, and 64 which adjust the image forming state of the main body section 20a by moving a part of or the whole main body section 20a.

The main body section 20a includes a first group 30, a second group 45, a third group 60, and a diaphragm 70 in order from the side of the screen SC. In addition, the second group includes an adjustment optical device group 40 and a rotationally symmetric lens group 90 (refer to FIG. 5B or the like). The adjustment optical device group 40 can be replaced with the rotationally symmetric lens group 90. FIG. 3A illustrates a state into which the adjustment optical device group 40 is inserted. Further, FIGS. 3B and 3C respectively illustrate the display region A2 of the screen SC (refer to FIG. 1) in the first operating state into which the adjustment optical device group 40 is inserted and in the second operating state into which a rotationally symmetric lens group 90 is inserted.

The first group 30 includes a first lens unit 31 and a second lens unit 32. For example, the focus state of the main body section 20a can be adjusted by slightly moving at least one lens included in the first lens unit 31 manually along the optical axis OA. Further, the second lens unit 32 includes first, second, and third lens groups 32a, 32b, and 32c as shown in FIG. 4A. Each of the lens groups 32a, 32b, and 32c includes one or more lenses. The main body section 20a can change the projection magnification by moving the lens groups 32a, 32b, and 32c or at least one lens which is included in the lens groups 32a, 32b, and 32c along the optical axis OA using a zoom drive mechanism 61 shown in FIG. 3A.

Figure 4A:
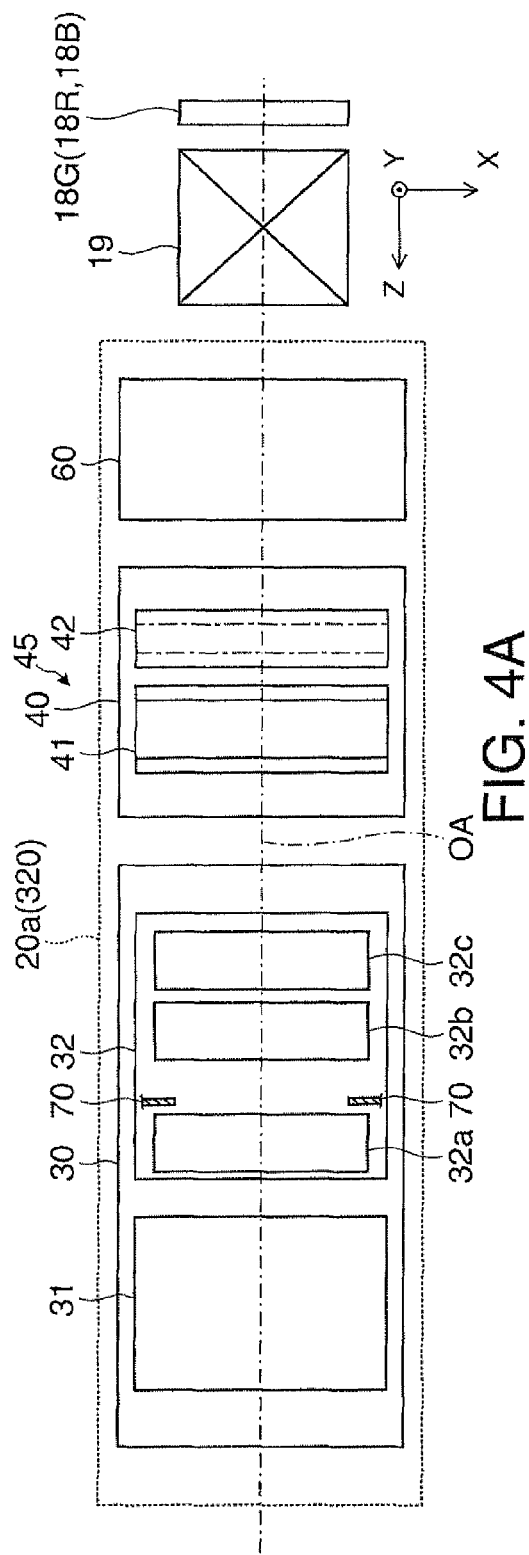
FIG. 4A is a view illustrating the configuration of the lateral section of the optical projection system in the first operating state.
Figure 4B:
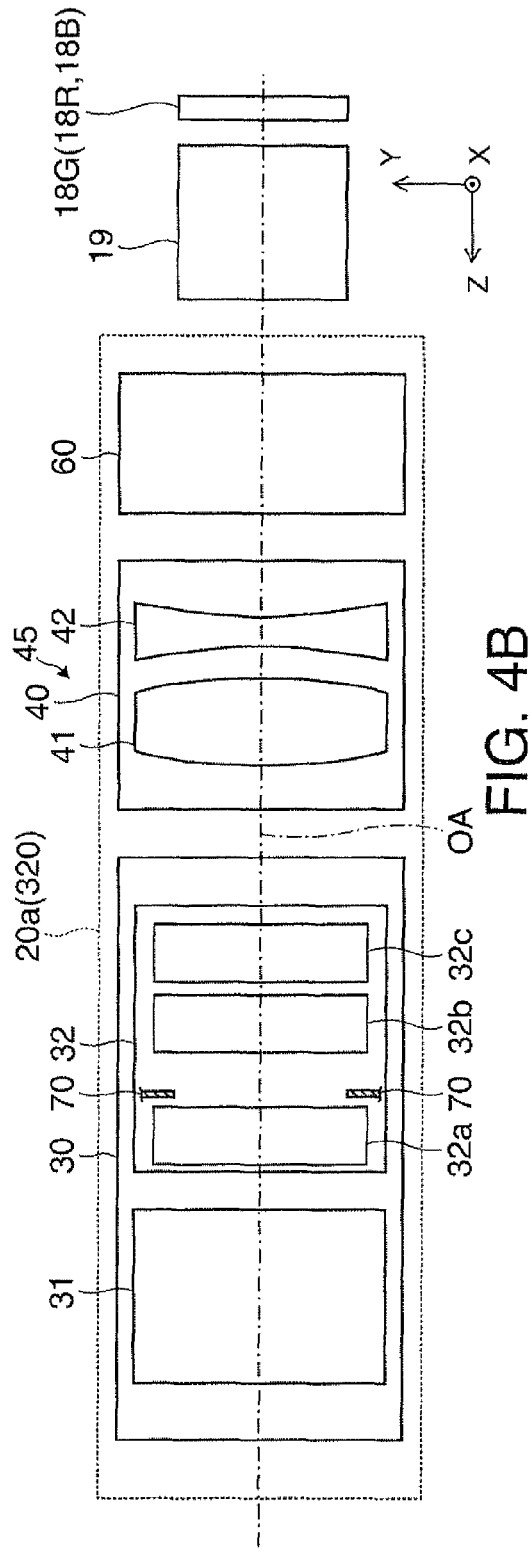
FIG. 4B is a view illustrating the configuration of the longitudinal section of the optical projection system in the first operating state.

The adjustment optical device group 40 of the second group 45 has focal distances which are different from each other in the lateral direction (X direction) and the longitudinal direction (Y direction). As a result, all the system of the optical projection system 20 including the first group 30 has focal distances which are different from each other in the longitudinal direction and the lateral direction. That is, the magnification in the longitudinal direction is different from the magnification in the lateral direction due to the main body section 20a, thereby projecting an image, having the aspect ratio AR2 which is different from the aspect ratio AR0 of the image displayed on the liquid crystal panel 18G (18R, 18B), on the screen SC. The adjustment optical device group 40 includes one or more optical devices for adjustment, which have a rotationally asymmetric surface with respect to the optical axis OA. In detail, with regard to the section in the longitudinal direction (Y direction) shown in FIG. 4B, the adjustment optical device group 40 includes a first optical device group 41 having positive power and a second optical device group 42 having negative power in order from the screen SC. In addition, the first optical device group 41 and the second optical device group 42 do not have power with regard to the section in the lateral direction (X direction) shown in FIG. 4A.

As described above, by combining the adjustment optical device group 40 which is an anamorphic optical system with the first optical device group 41 having positive refractive power and the second optical device group 42 having negative refractive power with respect to the longitudinal section, magnification can be changed easily, that is, zooming operation can be performed.

Figure 3A:
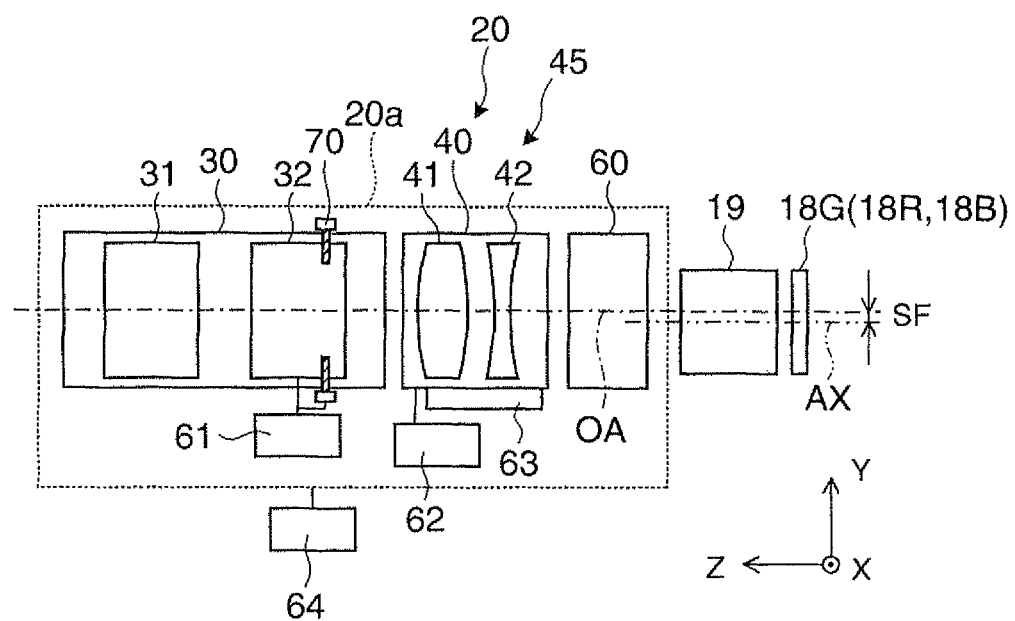
FIG. 3A is a view illustrating the configuration of the optical projection system of the projector shown in FIG. 1.

Further, in the optical projection system 20, the first anamorphic drive mechanism 62, which is an advancing and retracting drive mechanism shown in FIG. 3A, arranges the rotationally symmetric lens group 90 on the optical path instead of the adjustment optical device group 40, or arranges the adjustment optical device group 40 on the optical path instead of the rotationally symmetric lens group 90, so that it is possible to change the aspect ratio of an image to be projected on the screen SC at a desired timing.

The rotationally symmetric lens group 90 shown in FIGS. 5A and 5B, is an adjustment optical device group which has the same focal distance in the lateral direction (X direction) and the longitudinal direction (Y direction). As a result, a whole system of the optical projection system 20 which includes the first group 30 has the same focal distance in the longitudinal direction and the lateral direction. That is, the magnification in the longitudinal direction and the lateral direction is the same because of the main body section 20a, so that it is possible to project an image, which has the same aspect ratio as the aspect ratio AR0 of the image displayed on the liquid crystal panel 18G (18R, 18B), on the screen SC. The rotationally symmetric lens group 90 includes one or more optical devices for adjustment, which have a rotationally symmetric surface with respect to the optical axis OA. In detail, as shown in FIGS. 5A and 5B, in order from the side of the screen SC, the rotationally symmetric lens group 90 includes a first optical device group 91 having positive power and a second optical device group 92 having negative power. Each of the optical device groups 91 and 92 is rotationally symmetrical, so that each of the optical device groups 91 and 92 has the same power in the longitudinal direction and the lateral direction. As a result, as a whole, the rotationally symmetric lens group 90 has the same power in the longitudinal direction and the lateral direction. Further, in this case, positive power and negative power are all together at the rotationally symmetric lens group 90 and the adjustment optical device group 40, so that it is possible to comparatively easily and accurately adjust the power of each of the optical device groups 91 and 92 of the rotationally symmetric lens group 90 to a predetermined state.

Figure 3B:
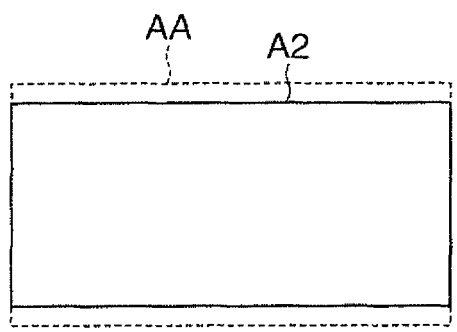
FIG. 3B is a view illustrating the display region of a surface to be projected in a first operating state.
Figure 3C:
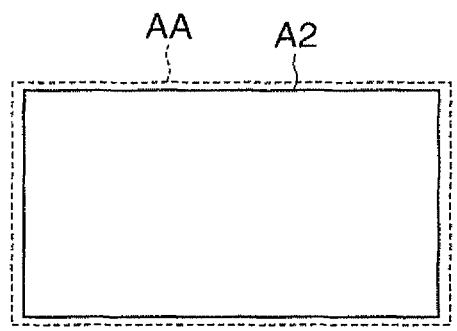
FIG. 3C is a view illustrating the display region of a surface to be projected in a second operating state.

As described above, in the optical projection system 20, by inserting the rotationally symmetric lens group 90 into a place where the adjustment optical device group 40 is arranged on the optical path while advancing and retracting the adjustment optical device group 40, it is possible to change the first operating state in which the adjustment optical device group 40 is placed on the optical path with the second operating state in which the rotationally symmetric lens group 90 is placed on the optical path. As shown in FIG. 6A, by using the first operating state in which the adjustment optical device group 40 is placed on the optical path, it is possible to project an image on the screen SC at an aspect ratio (for example, 2.4:1) that an image formed on the liquid crystal panel 18G (18R, 18B) is compressed in the longitudinal direction. Meanwhile, as shown in FIG. 6B, by using the second operating state in which the rotationally symmetric lens group 90 is inserted into a place where the adjustment optical device group 40 is arranged while evacuating the adjustment optical device group 40 from the optical path, it is possible to project an image on the screen SC at the aspect ratio (for example, 1.78:1) of an image formed on the liquid crystal panel 18G (18R, 18B) without change. In this case, as shown in FIG. 3B, if it is assumed that the display region in the case where the second group 45 is not installed is the display region AA, the display region AA is comparatively strongly compressed in the longitudinal direction and the display region A2, which has a shape laterally longer than that of the display region AA, is formed in the first operating state into which the adjustment optical device group 40 is inserted. Meanwhile, as shown in FIG. 3C, in the second operating state into which the rotationally symmetric lens group 90 is inserted, the display region AA is comparatively weakly compressed in both directions, that is, in the longitudinal direction and the lateral direction, and the display region A2, which has a shape similar to that of the display region AA, is formed. In addition, it is possible to move the first optical device group 41 and the second optical device group 42 which are included in the adjustment optical device group 40 in the optical axis OA direction by using the second anamorphic drive mechanism 63. By adjusting the distances between these, it is possible to continuously increase or decrease the aspect ratio of an image to be projected on the screen SC.

Further, as shown in FIG. 3A, in the optical projection system 20, by adjusting the amount of shift by moving the whole main body section 20a in the direction which is perpendicular to the optical axis OA using the entire system drive mechanism 64, the amount of deviation can be increased and decreased from the optical axis OA of the image to be projected on the screen SC. That is, by moving the optical axis OA of the main body section 20a by only an appropriate amount of shift SF with respect to the central axis AX of the liquid crystal panel 18G while maintaining the state of the optical axis OA of the main body section 20a to be parallel to the central axis AX of the liquid crystal panel 18G, the image can be projected on a position which is separated from the optical axis OA, for example, in the upper direction (+Y direction), and the projection position of the image can be vertically moved in the longitudinal direction by adjusting the amount of shift SF. In addition, the amount of shift SF, which is the amount of deviation based on the central axis AX of the liquid crystal panel 18G of the optical axis OA of the main body section 20a, is not necessarily variable, and can be fixed to, for example, a value which is not 0. Further, the whole main body section 20a can be appropriately moved in the direction along the optical axis OA using the entire system drive mechanism 64.

The third group 60 includes one or more rotationally symmetric lens having power in the lateral direction and the longitudinal direction. Since the third group 60 has positive power, the third group 60 can restrain the spread of light which is emitted from the optical modulation device. Therefore, the third group 60 can restrain the angle of light which is incident on the second group 45, and can restrain aberration which occurs in the second group 45. As a result, the third group 60 can restrain all aberrations. Therefore, the third group 60 includes a plurality of lenses as correction optical devices, and lenses having positive power from among the plurality of lenses include aspherical surfaces as necessary.

The diaphragm 70 is arranged in the vicinity of, for example, any of the lenses included in the second lens unit 32 of the first group 30. In the example shown in FIG. 4A, the diaphragm 70 is arranged between the first and second lens groups 32a and 32b of the second lens unit 32. The diaphragm 70 has a function of adjusting the state of image light by partially shading light flux which passes through the first group 30, that is, image light. In detail, the diaphragm 70 causes the section of light flux which passes through the first group 30 to have a predetermined size and shape at a corresponding position of the optical axis OA. Therefore, by controlling the image light emitted from the liquid crystal panel 18G (18R, 18B), the emission angle and direction of the principal ray of the light flux can be adjusted. Further, the diaphragm 70 moves along the optical axis OA in association with the zoom operation of the second lens unit 32 of the first group 30 using the zoom drive mechanism 61 in any one of the first operating state and the second operating state. That is, by moving the diaphragm 70 along the optical axis OA, the zoom drive mechanism 61 can zoom the emission state of the image light emitted from the liquid crystal panel 18G (18R, 18B), that is, can cause the emission state to be the appropriate state based on projection magnification.

The zoom drive mechanism 61, the first anamorphic drive mechanism 62 which corresponds to the advancing and retracting drive mechanism, the second anamorphic drive mechanism 63, and the entire system drive mechanism 64 include a motor, a mechanical transmission mechanism, a sensor, or the like, and operate in response to a drive signal from the lens drive unit 83 shown in FIG. 2. Theses drive mechanisms 61, 62, 63, and 64 do not only independently operate but also compositely operate in response to the drive signal from the lens drive unit 83. For example, by operating the entire system drive mechanism 64 in accordance with the operation of the zoom drive mechanism 61, a phenomenon in which an image shifts when the image is zoomed can be restrained.

Here, the function of the optical projection system 20 shown in FIG. 3A or the like will be described in further detail. In the case of the optical projection system 20, the adjustment optical device group 40 of the second group 45 can be replaced with the rotationally symmetric lens group 90 at a position where is comparatively near to the liquid crystal panel 18G (18R, 18B) and the ray of each image height passes through the second group 45 along a path which is comparatively near to the image height, so that the ray can be controlled easily. Therefore, it is possible to restrain the occurrence of aberration attributable to the replacement operation of the adjustment optical device group 40 of the second group 45 with the rotationally symmetric lens group 90. Generally, it is difficult to manufacture a rotationally asymmetric optical device, and it is necessary to reduce the size of the adjustment optical device group 40 in order to achieve accuracy. At this point, as the adjustment optical device group 40 is closer to the liquid crystal panel 18G (18R, 18B), the ray is less spread, and the sizes of the first optical device group 41 and the second optical device group 42 which are included in the adjustment optical device group 40 can be reduced. Therefore, it can be expected that a highly precise lens process is performed on the optical device groups 41 and 42, the performance of the optical projection system 20 is improved, and the cost thereof can be reduced. Further, the optical projection system 20 includes the third group 60 which is the closest to the liquid crystal panel 18G (18R, 18B), so that aberration can be effectively and reasonably corrected using a comparatively simple optical system. With such third group 60, it is possible to further significantly attempt to improve performance. In detail, it is possible to restrain the spread of light flux within the second group 45 using the third group 60, and it is possible to prevent the diameter of the second group 45 from increasing. Further, the anamorphic type adjustment optical device group 40 is used as the substantially afocal system, so that it is possible to secure accuracy while lowering the request for the accuracy of the positions of lenses included in the adjustment optical device group 40.

Figure 7A:
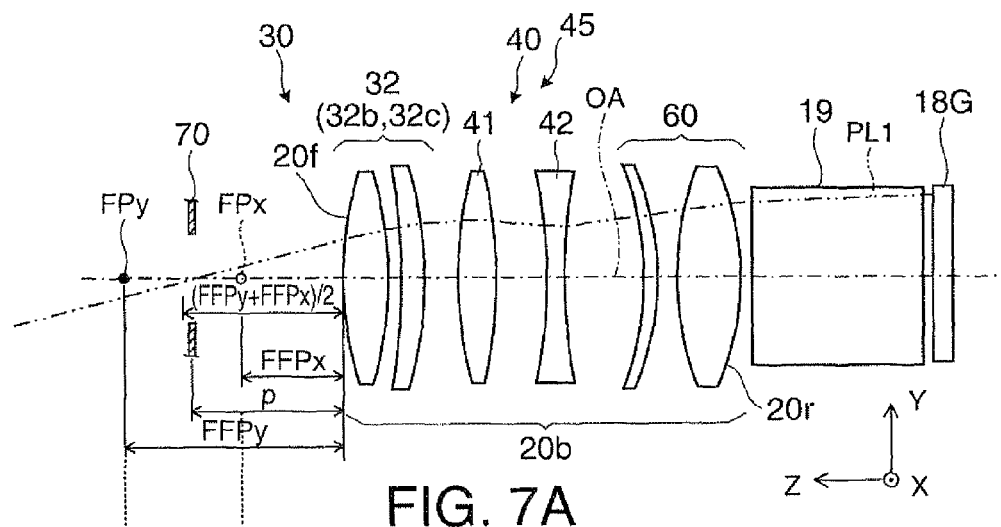
FIGS. 7A and 7B are longitudinal section and lateral section views each illustrating a focal position and a diaphragm position in the first operating state.
Figure 7B:
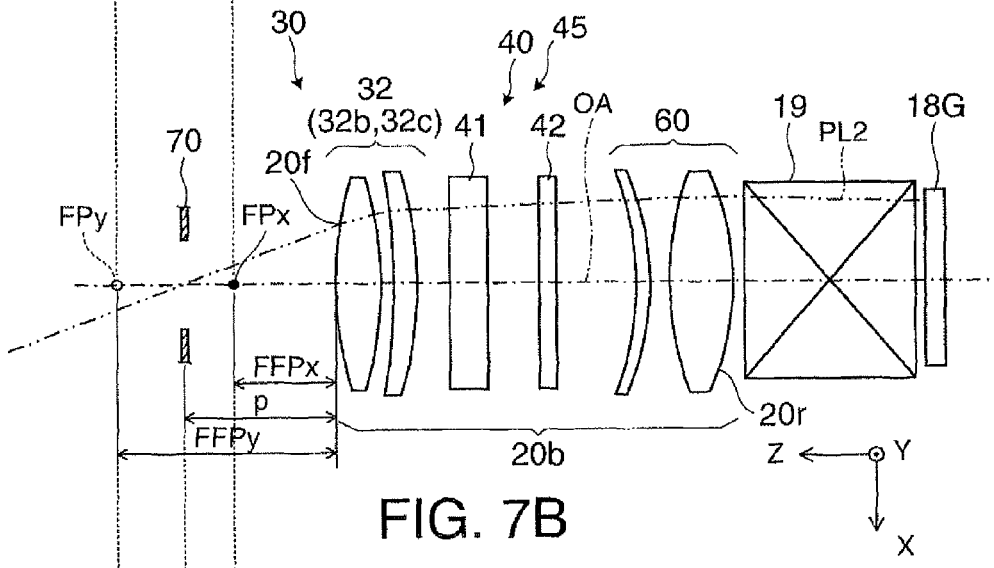
Figure 7C:
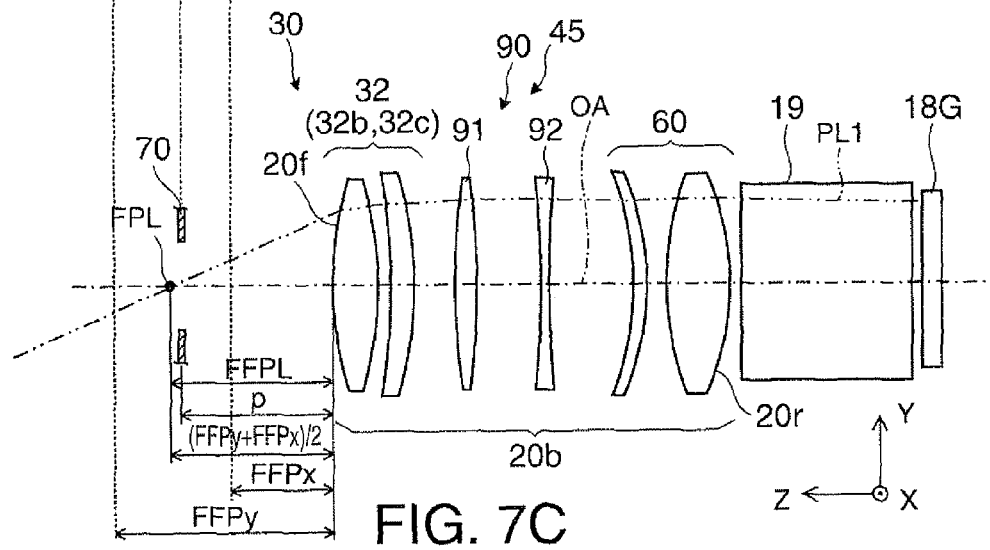
FIG. 7C is a lateral section view illustrating a focal position and a diaphragm position in the second operating state.

FIGS. 7A and 7B are views illustrating the focal position of the optical projection system 20 and the arrangement of the diaphragm 70 in the first operating state in which the adjustment optical device group 40 of the second group 45 is arranged on the optical path. FIG. 7C is a view illustrating the focal position of the optical projection system 20 and the arrangement of the diaphragm 70 in the second operating state in which the adjustment optical device group 40 of the second group 45 is withdrawn from the optical path and the rotationally symmetric lens group 90 is inserted. Here, in the optical projection system 20, an optical modulation device side lens group 20b, which is arranged from the liquid crystal panel 18G (18R, 18B) to the diaphragm 70 as a section which affects telecentricity in a subject side will be considered. In the case of the drawings, the optical modulation device side lens group 20b includes the second and third lens groups 32b and 32c of the second lens unit 32 of the first group 30, the second group 45, that is, the adjustment optical device group 40, the rotationally symmetric lens group 90, and the third group 60. That is, on the subject side of the diaphragm 70, the third lens group 32c of the first group 30, the adjustment optical device group 40, and the third group 60 are arranged in the first operating state. Further, in the second operating state, the rotationally symmetric lens group 90 is arranged instead of the adjustment optical device group 40 from among them. Further, in the cases shown in FIGS. 7A to 7C, the position of the diaphragm 70 is not changed or is changed by a small amount in the first operating state and the second operating state.

First, in the longitudinal section of the optical modulation device side lens group 20b, that is, in the YZ section, in the first operating state shown in FIG. 7A, it is assumed that the distance between the screen SC side focus FPy of the optical modulation device side lens group 20b and the screen SC side end surface 20f of the optical modulation device side lens group 20b is set to FFPy. Further, in the lateral section of the optical modulation device side lens group 20b, that is, in the XZ section, in the first operating state shown in FIG. 7B, it is assumed that the distance between the screen SC side focus FPx of the optical modulation device side lens group 20b and the screen SC side end surface 20f of the optical modulation device side lens group 20b is FFPx. Meanwhile, in the longitudinal section of the optical modulation device side lens group 20b, that is, in the YZ section, in the second operating state shown in FIG. 7C, it is assumed that the distance between the screen SC side focus FPL of the optical modulation device side lens group 20b and the screen SC side end surface 20f of the optical modulation device side lens group 20b is FFPL. In addition, in the lateral section, that is, the XZ section, in the second operating state, the rotationally symmetrical lens group 90 is rotationally symmetric and the focus in the lateral section, that is, the XZ section, is equivalent to the focus FPL in the longitudinal section, so that the graphic display and description thereof are omitted. As shown in FIGS. 7A to 7C, theses distances FFPx, FFPy, and FFPL satisfy the following expression.

$$FFPx < FFPL < FFPy \quad (1)$$

In addition, in the case where FFPy<FFPx, the relationship thereof is as follows.

$$FFPy < FFPL < FFPx \quad (1)'$$

That is, in any case of the above conditions (1) and (1)', the distance FFPL is between the distance FFPx and the distance FFPy.

Further, in the first operating state shown in FIGS. 7A and 7B, it is assumed that the distance between the diaphragm 70 and the screen SC side end surface 20f of the optical modulation device side lens group 20b is "p". In this case, the distance p is set in the range between the distance FFPx and the distance FFPy. That is, if FFPx<FFPy, the distance p is set in the range of Condition (2) below.

$$FFPx < p < FFPy \quad (2)$$

Further, if FFPy<FFPx, the distance p is set in the range of condition (2)' below.

$$FFPy < p < FFPx \quad (2)'$$

Here, the optical projection system 20 illustrated in FIGS. 7A and 7B has the focus FPx of the lateral section which is closer to the end surface 20f than the focus FPy of the longitudinal section, so that FFPx<FFPy, thereby having relatively large magnification power in the lateral direction and increasing the aspect ratio of the image. In this case, setting is made such that the distance p is included in the range of Condition (2), thereby being greater than the lower limit FFPx and being less than the upper limit FFPy.

It can be seen that the above Conditions (2) and (2)' define the arrangement range of the diaphragm 70 in order to excellently maintain telecentricity of the optical projection system 20 in the first operating state while the direction of a field angle is considered. When the diaphragm 70 is arranged in the ranges of Conditions (2) and (2)', it is possible to secure the usage efficiency of light by improving telecentricity. Therefore, it is possible to improve the performance of the projector 2. For example, in the case of the optical projection system 20 which causes an image to be compressed in the longitudinal direction, generally FFPx<FFPy. Therefore, the light flux, corresponding to the greatest field angle of the light flux up to the liquid crystal panel 18G (18R, 18B) side end surface 20r of the optical modulation device side lens group 20b, is not parallel to the optical axis OA and has an inclination. In particular, the principal ray PL1 corresponding to the image at the periphery of the longitudinal section slopes inward of the screen SC, and the principal ray PL2 corresponding to the image at the periphery of the lateral section slopes outward of the screen SC. As a result, the optical projection system 20 is not telecentric to any of the longitudinal and lateral directions in a strict sense but improves telecentricity in a balanced manner with regard to the longitudinal direction and the lateral direction. In addition, if the diaphragm 70 is arranged on the side of the screen SC while exceeding the upper limit of Condition (2), all the principal rays corresponding to the images at the periphery of the lateral section and the longitudinal section slope outward of the screen SC to be separated from the optical axis OA, so that telecentricity of the optical projection system 20 is greatly distorted. In contrast, if the diaphragm 70 is arranged on the side of the screen SC while exceeding the lower limit of Condition (2), all the principal rays corresponding to the images at the periphery of the lateral section and the longitudinal section slope inward of the screen SC to be close to the optical axis OA, so that telecentricity of the optical projection system 20 is greatly destroyed.

In addition, in the case of the second operating state shown in FIG. 7C, the position of the diaphragm 70 is not changed compared to the first operating state, and the distance FFPL satisfies the above-described Condition (1), so that telecentricity is improved in a balanced manner.

The preferable arrangement of the diaphragm 70 is in the range from the intermediate position between the focus FPy of the longitudinal section of the optical modulation device side lens group 20b and the focus FPx of the lateral section of the optical modulation device side lens group 20b to the focal position of the end surface 20f side or the subject side. That is, in the case where FFPx<FFPy, the distance p is set in the range of following Condition (3).

$$FFPx < p \leq (FFPy + FFPx)/2 \quad (3)$$

Further, in the case where FFPy<FFPx, the distance p is set to a value included in the range of the following Condition (3)'.

$$FFPy < p \leq (FFPy+FFPx)/2 \qquad (3)'$$

Here, in the optical projection system 20 illustrated in FIGS. 7A and 7B, FFPx<FFPy, so that the aspect ratio of an image having relatively large magnification power in the lateral direction is increased. In this case, the distance p is set in the range of Condition (3). The distance p is greater than the lower limit FFPx and less than the upper limit (FFPy+FFPx)/2. Therefore, it is possible to comparatively improve telecentricity in the intermediate direction of the lateral direction and the longitudinal direction, it is possible to reduce the directional bias of telecentricity, and it is possible to project a bright image in which it is difficult to cause unevenness depending on the direction of observation.

Next, the distance FFPL shown in FIG. 7C will be described in further detail. In this case, the distance FFPL is set such that the distance FFPL is substantially equal to (FFPy+FFPx)/2. That is, the distance FFPL is adjusted such that the power of each of the optical device groups 91 and 92 of the rotationally symmetric lens group 90 is ranged between the power in the longitudinal direction and the power in the lateral direction, the powers being of the first and second optical device groups 41 and 42 included in the adjustment optical device group 40, so that the distance FFPL is as follows.

$$FFPL \approx (FFPy+FFPx)/2 \qquad (4)$$

In detail, the positive and negative powers of the first and second optical device groups 91 and 92 included in the rotationally symmetric lens group 90 shown in FIG. 7C are made to be half the positive and negative powers of the first and second optical device groups 41 and 42 included in the adjustment optical device group 40 shown in FIG. 7A. Therefore, the state of the rotationally symmetric lens group 90 can be the intermediate state between the state in which the power of the adjustment optical device group 40 shown in FIG. 7A is present and the state in which the power of the adjustment optical device group 40 shown in FIG. 7B is not present. Further, as the above expression (4), the focus FPL can be positioned approximately between the focus FPx and the focus FPy. In this case, if FFPx<FFPy, the distance FFPL is set in the range of the above Condition (1). Further, if FFPy<FFPx, the distance FFPL is set in the range of the above Condition (1)'. In the above case, the distance FFPL is not greatly different from the distance p. That is, the position of the focus FPL and the position of the diaphragm 70 can be set in a close range to some extent. The state of the distance FFPL is between the distance FFPx and the distance FFPy. Therefore, when comparatively high telecentricity is maintained in the first operating state by setting the distance FFPL in the range of the above Condition (2) or (3), comparatively high telecentricity can be maintained in the second operating state. Further, when setting is made such that the distance FFPL is approximately equal to the distance p, it is possible to reduce the directional bias of telecentricity in the second operating state, thereby appropriately implementing telecentricity.

Figure 8A:
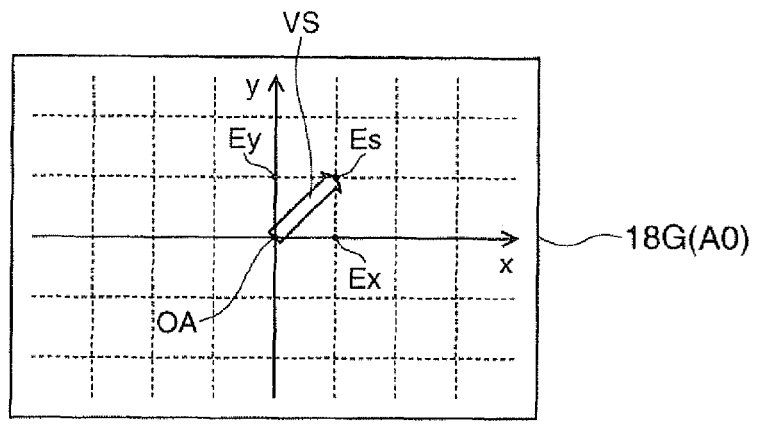
FIG. 8A is a view illustrating the position of a liquid crystal panel on the display region.

Hereinafter, the coordinates of the display region A0 of the liquid crystal panel 18G will be considered with reference to FIG. 8A. Here, an x axis corresponding to the lateral X direction and y axis corresponding to the longitudinal Y direction are determined based on the optical axis OA. When the emission angle of the principal rays from the liquid crystal panel 18G is considered in the optical projection system 20 having a vertically and horizontally asymmetric anamorphic type lens system, it has been known that it is not sufficient to consider only a horizontal axis position along an x axis and a vertical axis position along a y axis, and it is necessary to consider a position in the oblique direction. That is, the emission angle (principal ray angle) of the principal ray is considered in the direction shown using oblique vector VS in the drawing. Here, it is assumed that the horizontal axis position along the x axis and the principal ray angle from the horizontal axis position have an approximately substantially linear shape, and the vertical axis position along the y axis and the principal ray angle from the vertical axis position have an approximately substantially line shape. In the same manner, an oblique position Es which is parallel to the vector VS and the principal ray angle from the oblique position Es can be handled to have a substantially line shape.

Figure 8B:
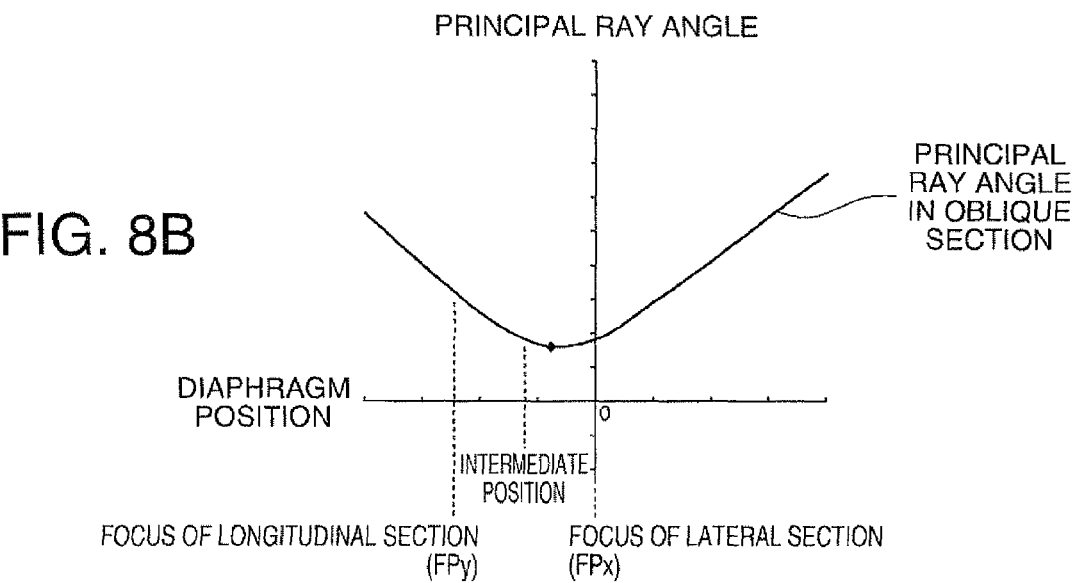
FIG. 8B is a view illustrating the relationship between a principal ray angle and a diaphragm position in the oblique section of the liquid crystal panel.

FIG. 8B illustrates an example of a result of simulation in which the principal ray angle of the oblique position Es of the apex of the vector VS is calculated while changing the position of the diaphragm 70.

As is clear from the chart, the minimum value of the principal ray angle is between the focus FPy of the longitudinal section of the optical modulation device side lens group 20b and the focus FPx of the lateral section. That is, when the position of the diaphragm 70 is set between the focus FPy of the longitudinal section and the focus FPx of the lateral section, it can be seen that the increase in the principal ray angle can be restrained as a whole. In other words, it is preferable that the distance p ranging from the end surface 20f of the optical modulation device side lens group 20b to the diaphragm 70 be set between the distance FFPx and the distance FFPy. That is, it is preferable that the distance p be set within the range of the above Condition (2).

Further, if observed in more detail, the minimum value of the principal ray angle is between the intermediate position of the focus FPy of the longitudinal section and the focus FPx of the lateral section and the focus FPx of the lateral section. That is, when the position of the diaphragm 70 is set between the intermediate position of a pair of focuses FPy and FPx and the focus FPx of the lateral section, it can be considered that the increase in the principal ray angle is restrained as a whole. In other words, it can be considered that it is preferable that the distance p from the end surface 20f of the optical modulation device side lens group 20b to the diaphragm 70 be equal to or less than the average of the distance FFPx and the distance FFPy and equal to or greater than the distance FFPx. That is, it is preferable that the distance p be set within the range of the above Condition (3).

Figure 8C:
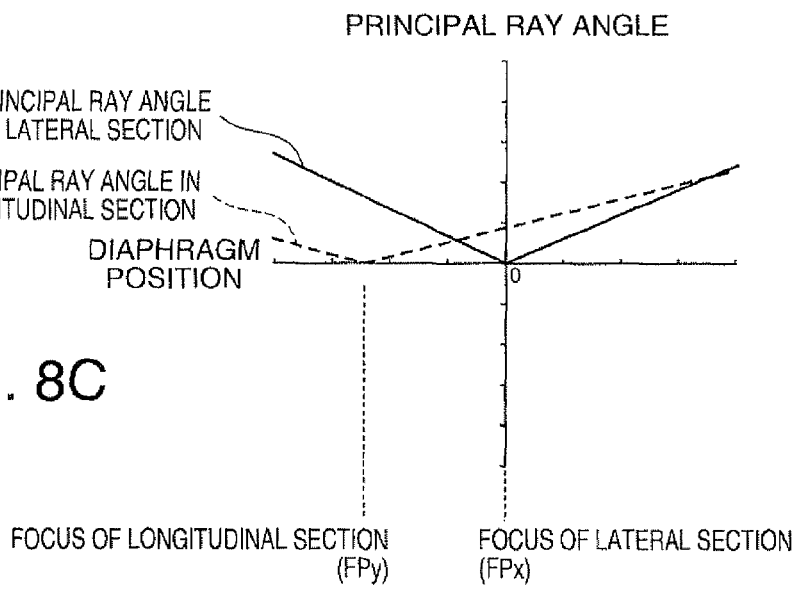
FIG. 8C is a view illustrating the relationship between a principal ray angle and a diaphragm position in the crosswise section of the liquid crystal panel.

FIG. 8C illustrates an example of a result of simulation in which the principal ray angle of a position Ex along the lateral x axis and a position Ey along the longitudinal y axis is calculated while changing the position of the diaphragm 70. As can be seen from a chart, when the diaphragm 70 is arranged at the focus FPx of the lateral section in the horizontal axis position Ex, the principal ray angle is 0. Meanwhile, when the diaphragm 70 is arranged at the focus FPy of the longitudinal section in the vertical axis position Ey, the principal ray angle is 0.

As described above, the field angle is considered in the first operating state, so that the optical projection system 20 according to the first embodiment is substantially telecentric on the subject side in both the first operating state into which the anamorphic optical system is inserted and the second operating state from which the anamorphic optical system is withdrawn. That is, rays from the liquid crystal panel 18G (18R, 18B) are nearly parallel to the optical axis OA in the longitudinal section, the lateral section, and the oblique section. Therefore, it is possible to relatively simply combine the liquid crystal panel 18G (18R, 18B) and the optical projection system 20 with high accuracy, so that the assembly thereof is good. Further, if light exiting from the liquid crystal panel 18G (18R, 18B) is integrated with the optical projection system 20 in a substantially telecentric state when projection is performed using movement in such a way that the optical projection system 20 is moved in the direction perpendicular to the optical axis OA, it is easy to secure the amount of peripheral light, thereby contributing to an improvement in image quality. Further, by using a substantially teletric state, color unevenness can be reduced when a three-plate type optical modulation device is used, thereby leading to an improvement in image quality.

Further, in the case of the optical projection system 20 according to the first embodiment, in the second operating state as shown in FIG. 6B, the rotationally symmetric lens group 90 is inserted into a place into which the adjustment optical device group 40 was inserted while the first group 30 and the third group 60 are fixedly installed on the optical path and adjustment optical device group 40 of the second group 45 is advanced and retracted on the optical path. This point is greatly different from the case where the rear arrangement-type relay system (refer to JP-A-2004-027496) in the related art is applied to a projection system. That is, when the rear arrangement-type relay system is detached from the rear arrangement-type relay system in the related art, the optical projection system approaches the imaging device as much as a portion approximate to the rear arrangement-type relay system. Meanwhile, in the case of the optical projection system 20 according to the first embodiment, even when the rotationally symmetric lens group 90 is inserted while the adjustment optical device group 40 is detached and withdrawn from the optical path, it is seldom necessary to change the position of the first group 30 or the third group 60. That is, in the case of crosswise magnification conversion which causes the adjustment optical device group 40 to be advanced and retracted on the optical path, it is not necessary to greatly move the first group 30 or the third group 60, and it is possible to reduce the load of a mechanical mechanism. In addition, when the rear arrangement-type relay system in the related art is applied to a projection system, crosswise magnification conversion can be performed by advancing and retracting the adjustment optical device group 40 which is a part of the rear arrangement-type relay system on the optical path. However, even when the second group is advanced and retracted on the optical path for crosswise magnification conversion, the main optical system is not greatly moved. Further, the rear arrangement-type relay system in the related art is fixed to the mount of the main optical system instead of the main optical system which can be independently used. Therefore, in the case of the rear arrangement-type relay system in the related art, there are problems in that the optical burden thereof increases, the length thereof increases in the optical axis direction, and the number of constituent lenses increases. However, according to the optical projection system 20 of the first embodiment, it is not necessary to cause the adjustment optical device group 40 of the second group 45 or the rotationally symmetric lens group 90 to function as a relay lens, and it is possible to shorten the total length thereof and to reduce the number of constituent lenses. Further, unlike the rear arrangement-type relay system in the related art, in the case of the optical projection system 20 of the first embodiment, not a part but the entire adjustment optical device group 40 or the rotationally symmetric lens group 90 is advanced and retracted while being independent of the first group 30 and the third group 60. Therefore, when the adjustment optical device group 40 and the rotationally symmetric lens group 90 are advanced and retracted or detached, an effect, such as an eccentricity or the like, to the first group 30 and the third group 60 can be reduced, and, further, comparatively independent arrangement can be realized in mechanical manner. When the optical projection system 20 is assembled, the assembly accuracy between the separate first group 30 and third group 60 may be considered by regarding the second group 45, that is, the adjustment optical device group 40, or the rotationally symmetric lens group 90 as a unit. Therefore, an improvement in assembly can be expected.

In the optical projection system 20, the optical axis OA of the main body section 20a can be moved by an appropriate amount of shift SF while the optical axis OA of the main body section 20a is maintained to be parallel to the central axis AX of the liquid crystal panel 18G, so that it is possible to perform projection using movement, and it is easy to prevent viewers and listeners and the image light PL from interfering with each other, and installation thereof is improved. In the state in which the main body section 20a of the optical projection system 20 shifts with respect to the liquid crystal panel 18G as described above, if zooming, in which the second lens unit 32 is operated and then projection magnification is changed, is performed by the zoom drive mechanism 61, the absolute amount of shift of the image light PL increases. Therefore, it is possible to improve the operability and installation property of the projector 2 by correcting the increase in the amount of shift attributable to zooming using the operation of the entire system drive mechanism 64. At this time, under the control of the main control unit 88, operability is further improved by automating the operation in such a way as to operate the zoom drive mechanism 61 together with the entire system drive mechanism 64.

In the case of the optical projection system 20 of the first embodiment, one or both sides of each of the optical device groups 41 and 42 which construct the adjustment optical device group 40 is a cylindrical lens surface. When compared to an anamorphic lens, a free-form surface lens, or the like, the cylindrical lens can be expected to be highly accurate because the cylindrical lens is comparatively easily processed, and the cost thereof can be reduced. Further, the sensitivity eccentricity of the plane section side is low and an assembly property is improved, so that high performance can be expected as a result. That is, by constructing the adjustment optical device group 40 using the cylindrical lens, cost can be reduced while the accuracy of the optical projection system 20 is secured.

The one side or both sides of each of the optical device groups 41 and 42 which construct the adjustment optical device group 40 are not limited to the cylindrical lens surface, and an anamorphic lens (for example, a toric or a toroidal lens) can be used.

In the above description, the one side or both sides of each of the cylindrical-type or the anamorphic lens-type optical device groups 41 and 42 which construct the adjustment optical device group 40 can have an aspherical surface type in detail, a shape expressed using the following polynomial expression h with respect to the lateral X section or the longitudinal Y section.

$$h = \frac{cy^2}{1+\sqrt{1-(1+k)c^2y^2}} + A_2 y^2 + A_4 y^4 + A_6 y^6 + A_8 y^8 + A_{10} y^{10} + \ldots$$

where y is the height of an image (image height) from the optical axis OA, c is the curvature of a spherical surface as the standard, k is a conic constant, and each of $A_2$, $A_4$, $A_6$, $A_8$, $A_{10}$, ... is a predetermined correction term.

Further, a free-form surface can be used as the one side or both sides of each of the optical device groups 41 and 42 which construct the adjustment optical device group 40. Since curvatures can be controlled in both sections of the Y direction and the X direction by using free-form surface lenses, astigmatic aberration can be reduced and high performance can be realized. Further, by using an aspherical surface, various types of aberrations can be reduced and high performance can be realized. Further, by using a free-form surface, it is easy to optimize the image forming state in the intermediate oblique direction, other than the longitudinal and lateral directions of the liquid crystal panel 18G (18R, 18B), in the image circle surface on the screen SC or on the liquid crystal panel 18G (18R, 18B), and it is possible to realize high performance.

FIGS. 9A and 9B are views illustrating the modification examples of the optical projection system 20 shown in FIGS. 6A and 6B. The adjustment optical device group 140 included in the second group 145 has different focal distances in the longitudinal direction (Y direction) and the lateral direction (X direction). As a result, the whole system of the optical projection system 20 including the first group 30 has different focal distances in the longitudinal direction and the lateral direction. In this case, the adjustment optical device group 140 includes, in order from the side of the screen SC, a first optical device group 141 having negative power and a second optical device group 142 having positive power with respect to the section in the lateral direction (X direction). As shown in FIG. 93, when the adjustment optical device group 140 is withdrawn from the optical path and then inserted into the rotationally symmetric lens group 190 included in the second group 145, it is possible to project an image on the screen SC at an aspect ratio (for example, 1.78:1) as the image formed on the liquid crystal panel 18G (18R, 18B). Further, as shown in FIG. 9A, it is possible to project an image on the screen SC at an aspect ratio (for example, 2.4:1) by arranging the adjustment optical device group 40 on the optical path, and enlarging an image to be formed on the liquid crystal panel 18G (18R, 18B) in the lateral direction. Further, by moving the first optical device group 141 and the second optical device group 142, which are included in the adjustment optical device group 140, in the direction of the optical axis OA using the second anamorphic drive mechanism 63 shown in FIG. 3A and adjusting the distance therebetween, the aspect ratio of an image to be projected on the screen SC can be continuously increased or reduced. In this case, in the first operating state, the display region A2, having a laterally long shape which is comparatively greatly expanded in the lateral direction, is formed on the screen Sc. Meanwhile, in the second operating state, the display region A2 having a shape which is comparatively a little expanded in both directions, that is, in the longitudinal direction and the lateral direction and maintaining an original aspect ratio, is formed. In addition, as shown in FIG. 9B, in the case of the modification example, the rotationally symmetric lens group 190 corresponds to the adjustment optical device group 140, and includes, in order from the side of the screen SC, a first optical device group 191 having negative power and a second optical device group 192 having positive power. That is, since the rotationally symmetric lens group 190 has positive and negative powers, it is possible to interchange the first operating state with the second operating state.

As described above, according to the optical projection system 20 of the embodiment, the optical modulation device side lens group 20b has powers which are different from each other in the longitudinal direction and the lateral direction of the liquid crystal panel 18G (18R, 18B). Therefore, even the entire system of the optical projection system 20 has focal distances which are different from each other in the longitudinal and lateral directions, and magnifications which are different from each other in the longitudinal and the lateral directions. Therefore, the aspect ratio of the image on the liquid crystal panel 18G (18R, 18B) can be different from the aspect ratio of the image to be projected on the screen SC. That is, conversion can be performed on the aspect ratio, which is a ratio of width to height, by the optical projection system 20. At this time, the distance p between the diaphragm 70 and the screen SC side end surface 20f of the optical modulation device side lens group 20b satisfies the above conditional expressions (2) and (2)' in the first operating state in which the adjustment optical device group 40 is arranged on the optical path, so that it is possible to secure predetermined or higher telecentricity in both directions, that is, in the longitudinal direction and the lateral direction. Further, the distance p satisfies the above conditional expressions (1), (1)' and (4) in the second operating state in which the adjustment optical device group 40 is withdrawn from the optical path and the rotationally symmetric lens group 90 is inserted, so that it is possible to secure telecentricity in the second operating state.

Example 1

Figure 10:
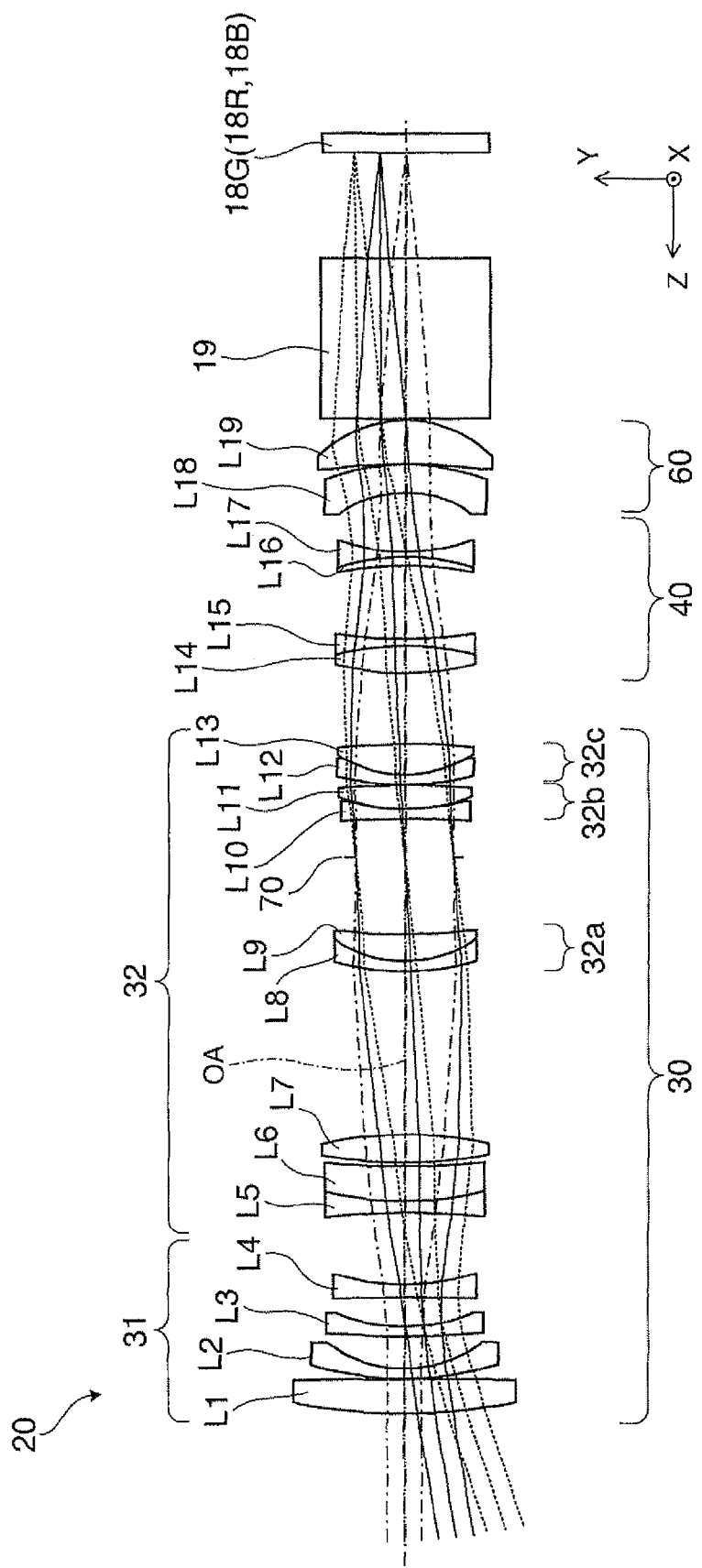
FIG. 10 is a view illustrating a longitudinal section in the first operating state of an optical system according to an Example 1 of the first embodiment.
Figure 11:
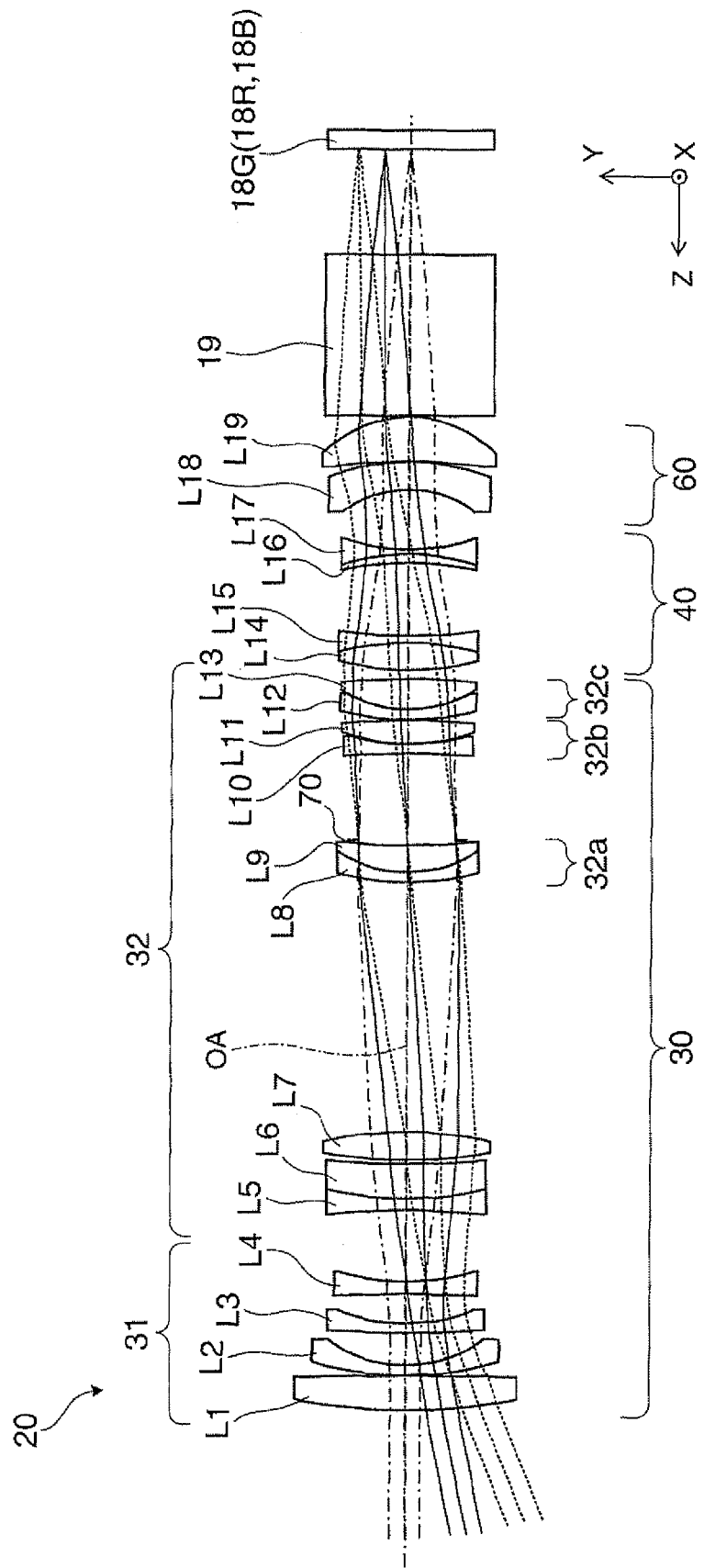
FIG. 11 is a view illustrating the longitudinal section in the case in which the optical system shown in FIG. 10 is a wide end.

FIGS. 10 to 11 are views illustrating a detailed Example 1 of the optical projection system 20 of the first embodiment, and illustrating the optical projection system 20 in the first operating state. FIG. 10 illustrates the state of a "tele end", in which magnification power is comparatively low. FIG. 11 illustrates the state of a "wide end", in which magnification power is comparatively high.

The optical projection system 20 includes lenses L1 to L19. The first group 30 is configured to include the lenses L1 to L13, the adjustment optical device group 40 is configured to include the lenses L14 to L17, and the third group 60 is configured to include the lenses L18 and L19. The lenses L1 to L13 included in the first group 30 are lenses having rotationally symmetric spherical surfaces around the optical axis OA. In the adjustment optical device group 40, the cemented lenses L14 and L15 are cylindrical lenses which have positive power with respect to the longitudinal Y direction but do not have power with respect to the lateral X direction. Further, the cemented lenses L16 and L17 are cylindrical lenses which have negative power with respect to the longitudinal Y direction but do not have power with respect to the lateral x direction. The lens L18 included in the third group 60 is a negative meniscus lens, and the lens L19 is a positive meniscus lens. In addition, in the first group 30, the first lens group 32a including the lenses L8 and L9, the second lens group 32b including the lenses L10 and L11, and the third lens group 32c including the lenses L12 and L13 are displaced along the optical axis OA when projection magnification is changed, that is, when zooming is performed. In addition, the lens L18 is an aspherical surface lens. In detail, the configuration expressed in the above-described polynomial expression h is applied to an aspherical surface expression in the same manner. That is, the configuration is specified by applying an appropriate number to the following expression.

$$h = \frac{cy^2}{1+\sqrt{1-(1+k)c^2y^2}} + A_2 y^2 + A_4 y^4 + A_6 y^6 + A_8 y^8 + A_{10} y^{10} + \ldots$$

Figure 12:
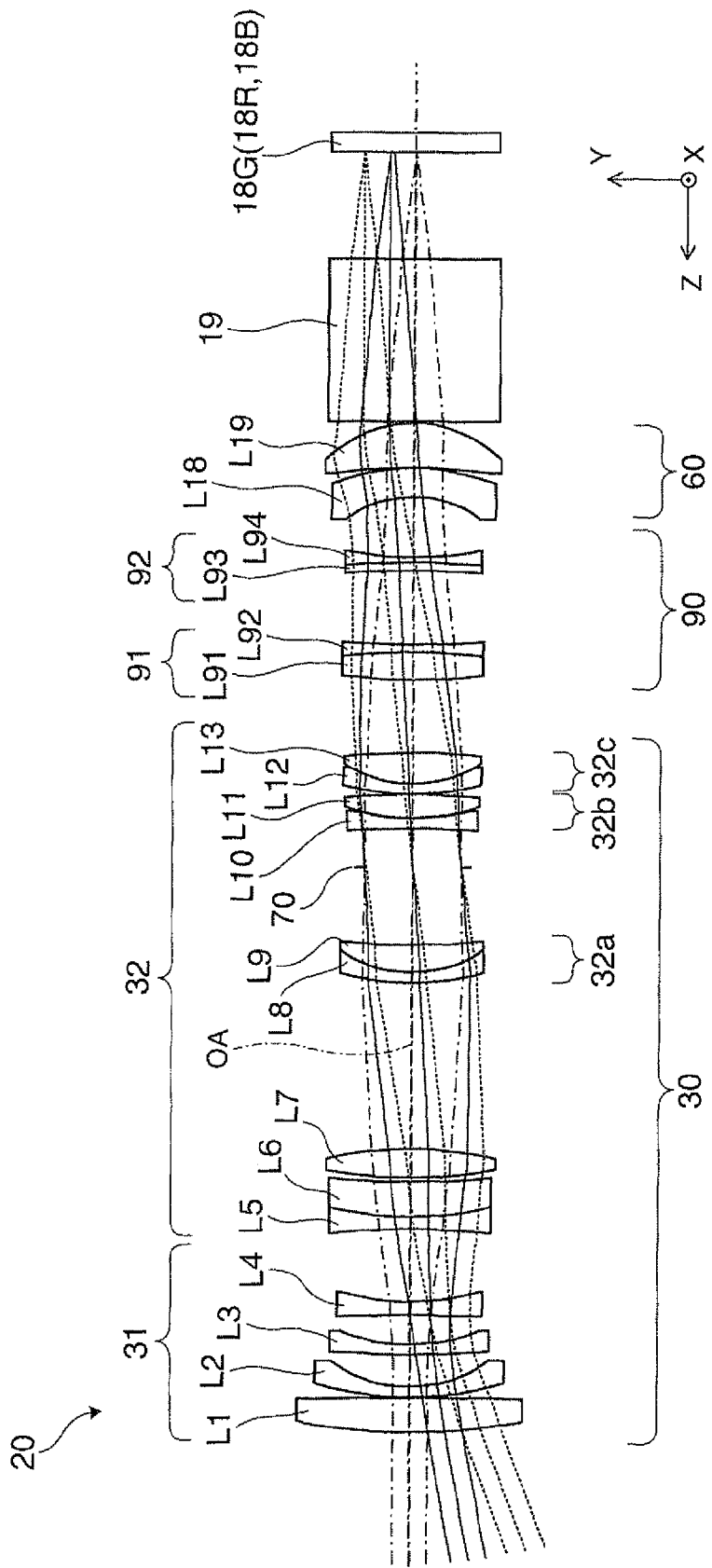
FIG. 12 is a view illustrating a longitudinal section in the second operating state of the optical system according to the Example 1 of the first embodiment.
Figure 13:
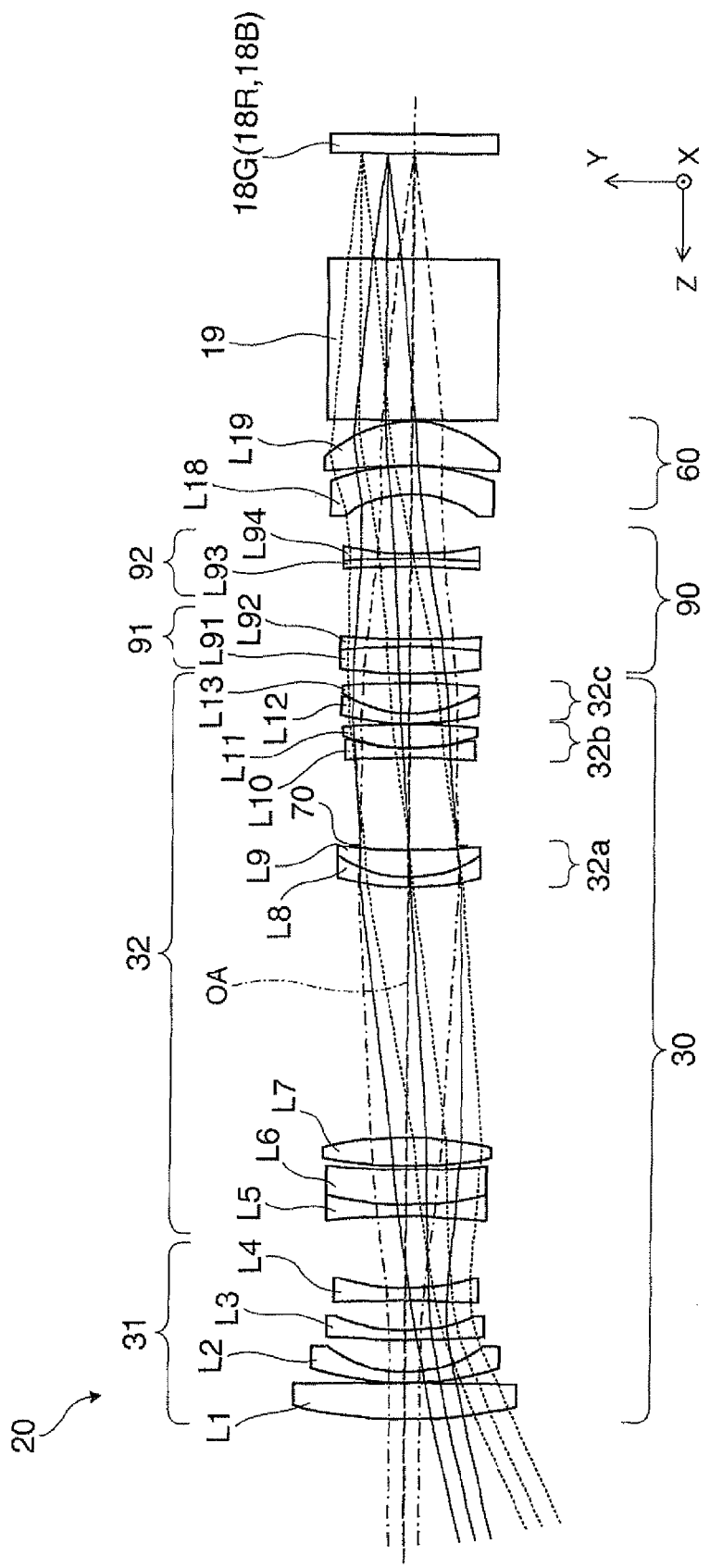
FIG. 13 is a view illustrating the longitudinal section in the case in which the optical system shown in FIG. 12 is a wide end.

Further, FIGS. 12 to 13 are views illustrating a detailed Example 1 of the optical projection system 20 of the first embodiment, and illustrating the optical projection system 20 in the second operating state. FIG. 12 illustrates the state of a "tele end", in which magnification power is comparatively low. FIG. 13 illustrates the state of a "wide end" in which magnification power is comparatively high.

In the case of the second operating state, the state of the optical projection system 20 is that the rotationally symmetric lens group 90 is inserted instead of the adjustment optical device group 40 as shown in the drawings. Here, the lenses L91 to L94 are included in the rotationally symmetric lens group 90. In the rotationally symmetric lens group 90, cemented lenses L91 and L92 have positive power, which is about half the power of the cemented lenses L14 and L15 (refer to FIG. 10) in the longitudinal Y direction. Further, the cemented lenses L93 and L94 have negative power, which is about half the power of the cemented lenses L16 and L17 (refer to FIG. 10) in the longitudinal Y direction.

In the following Table 1 and Table 2, the lens data or the like of the Example 1 is displayed. Table 1 relates to the optical projection system 20 in the first operating state, and Table 2 relates to the optical projection system 20 in the second operating state. In the top column of Table 1 and Table 2, "surface number" is a number assigned to the surface of each lens in order from an image surface side. Further, indicates a Y curvature radius or an X curvature radius, and "D" indicates lens thickness or air space between one of the lens surfaces and a remaining surface. Further, "Nd" indicates the refractive index of the "d" line of a lens material, and "vd" indicates the Abbe number of the "d" line of a lens material. In addition, in the case of Example 1, all surfaces, other than the surface of lens L18, are spherical surfaces or cylindrical surfaces. Further, with respect to the lens L18, which is the aspherical surface lens, the values at the bottom of Table 1 and Table 2 are applied to the above-described polynomial expression h.

TABLE 1

| Anamorphic mode | | | | |
|---|---|---|---|---|
| Surface No. | R | D | Nd | vd |
| 1 | 110.081 | 7.62 | 1.496999 | 81.5459 |
| 2 | 2195.673 | 0.12 | | |
| 3 | 67.818 | 2.20 | 1.583248 | 65.6788 |
| 4 | 27.581 | 7.08 | | |
| 5 | 171.231 | 2.24 | 1.846660 | 23.7779 |
| 6 | 40.183 | 6.46 | | |
| 7 | −375.675 | 2.75 | 1.496999 | 81.5459 |
| 8 | 51.503 | 15.78 | | |
| 9 | −190.142 | 2.67 | 1.684006 | 56.3687 |
| 10 | 70.490 | 7.69 | 1.667539 | 32.5809 |
| 11 | 158.500 | 0.72 | | |
| 12 | 91.958 | 6.45 | 1.694550 | 31.6292 |
| 13 | −78.544 | Variable | | |
| 14 | 54.253 | 2.20 | 1.760475 | 39.3195 |
| 15 | 26.914 | 5.98 | 1.673600 | 32.0758 |
| 16 | 160.053 | Variable | | |
| Diaphragm | Infinite | Variable | | |
| 18 | −223.300 | 2.24 | 1.806218 | 33.6257 |
| 19 | 63.667 | 0.10 | | |
| 20 | 50.169 | 5.24 | 1.497362 | 81.1974 |
| 21 | −99.682 | 0.10 | | |
| 22 | 74.469 | 2.20 | 1.811927 | 32.7877 |
| 23 | 29.967 | 6.76 | 1.540810 | 72.015 |
| 24 | −108.512 | Variable | | |
| 25 | 59.329 | 6.02 | 1.817396 | 43.801 |
| 26 | −61.195 | 1.60 | 1.727259 | 31.3658 |
| 27 | 101.057 | 16.21 | | |
| 28 | −71.372 | 1.89 | 1.836460 | 24.0735 |
| 29 | −47.438 | 1.10 | 1.496999 | 81.5459 |

TABLE 1-continued

| Anamorphic mode | | | | |
|---|---|---|---|---|
| Surface No. | R | D | Nd | vd |
| 30 | 42.674 | 13.00 | | |
| *31 | −32.372 | 6.50 | 1.491755 | 57.4711 |
| *32 | −45.428 | 0.10 | | |
| 33 | −140.554 | 9.94 | 1.504293 | 79.6637 |
| 34 | −26.381 | 0.19 | | |
| 35 | Infinite | 36.00 | 1.516330 | 64.142 |
| 36 | Infinite | | | |

*Aspherical surface
*25 to 30 surfaces are cylindrical lenses
The curvature in the X direction is 0

TABLE 2

| Normal mode | | | | |
|---|---|---|---|---|
| | R | D | Nd | vd |
| 1 | 110.081 | 7.62 | 1.496999 | 81.5459 |
| 2 | 2195.673 | 0.12 | | |
| 3 | 67.818 | 2.20 | 1.583248 | 65.6788 |
| 4 | 27.581 | 7.08 | | |
| 5 | 171.231 | 2.24 | 1.846660 | 23.7779 |
| 6 | 40.183 | 6.46 | | |
| 7 | −375.675 | 2.75 | 1.496999 | 81.5459 |
| 8 | 51.503 | 15.78 | | |
| 9 | −190.142 | 2.67 | 1.684006 | 56.3687 |
| 10 | 70.490 | 7.69 | 1.667539 | 32.5809 |
| 11 | 158.500 | 0.72 | | |
| 12 | 91.958 | 6.45 | 1.694550 | 31.6292 |
| 13 | −78.544 | Variable | | |
| 14 | 54.253 | 2.20 | 1.760475 | 39.3195 |
| 15 | 26.914 | 5.98 | 1.673600 | 32.0758 |
| 16 | 160.053 | Variable | | |
| Diaphragm | Infinite | Variable | | |
| 18 | −223.300 | 2.24 | 1.806218 | 33.6257 |
| 19 | 63.667 | 0.10 | | |
| 20 | 50.169 | 5.24 | 1.497362 | 81.1974 |
| 21 | −99.682 | 0.10 | | |
| 22 | 74.469 | 2.20 | 1.811927 | 32.7877 |
| 23 | 29.967 | 6.76 | 1.540810 | 72.015 |
| 24 | −108.512 | Variable | | |
| 25 | 113.624 | 6.02 | 1.817396 | 43.801 |
| 26 | −192.157 | 1.60 | 1.727259 | 31.3658 |
| 27 | 212.180 | 16.21 | | |
| 28 | −330.498 | 1.89 | 1.836460 | 24.0735 |
| 29 | −189.656 | 1.10 | 1.496999 | 81.5459 |
| 30 | 77.401 | 13.00 | | |
| *31 | −32.372 | 6.50 | 1.491755 | 57.4711 |
| *32 | −45.428 | 0.10 | | |
| 33 | −140.554 | 9.94 | 1.504293 | 79.6637 |
| 34 | −26.381 | 0.19 | | |
| 35 | Infinite | 36.00 | 1.516330 | 64.142 |
| 36 | Infinite | | | |

*Aspherical surface

As shown in FIGS. 10 to 13, because each of the lens groups 32a, 32b, and 32c included in the second lens unit 32, and the diaphragm 70 are moved separately along the direction of the optical axis OA, the zooming operation is performed separately in the first and second operating states.

Figure 14A:
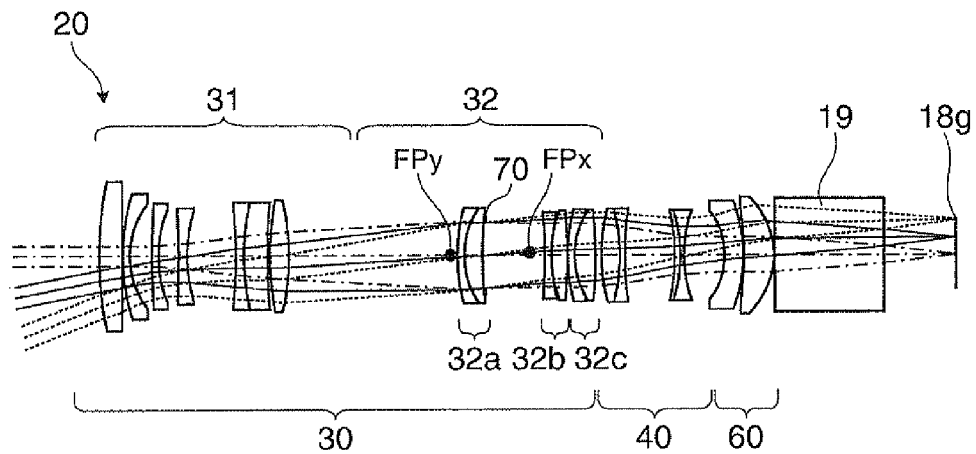
FIGS. 14A to 14C are views illustrating the zooming operation of the optical system in the first operating state of the Example 1 of the first embodiment.
Figure 14B:
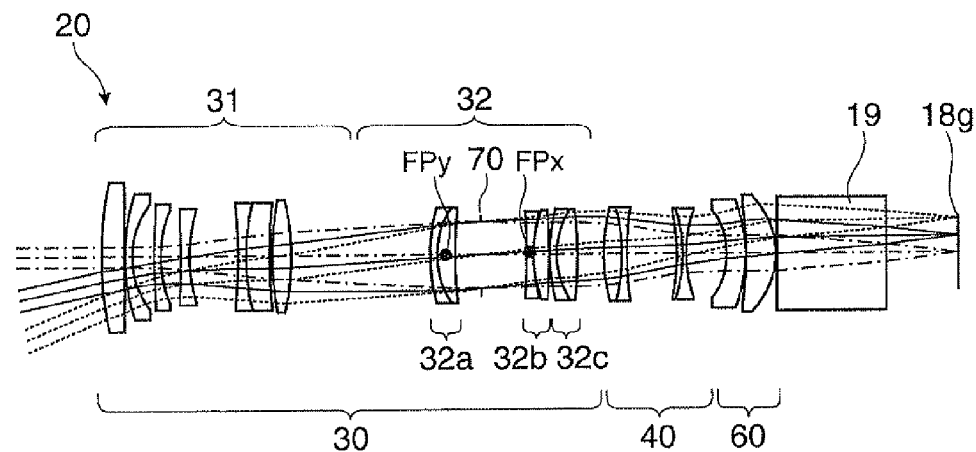
Figure 14C:
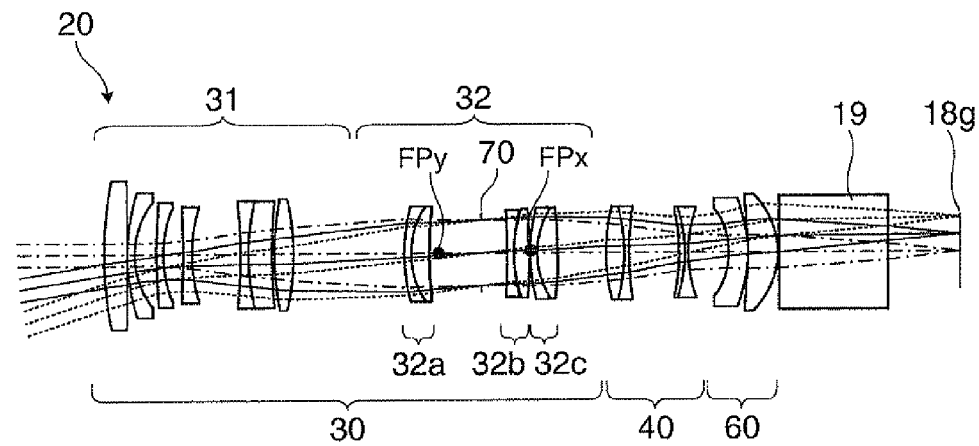
Figure 15A:
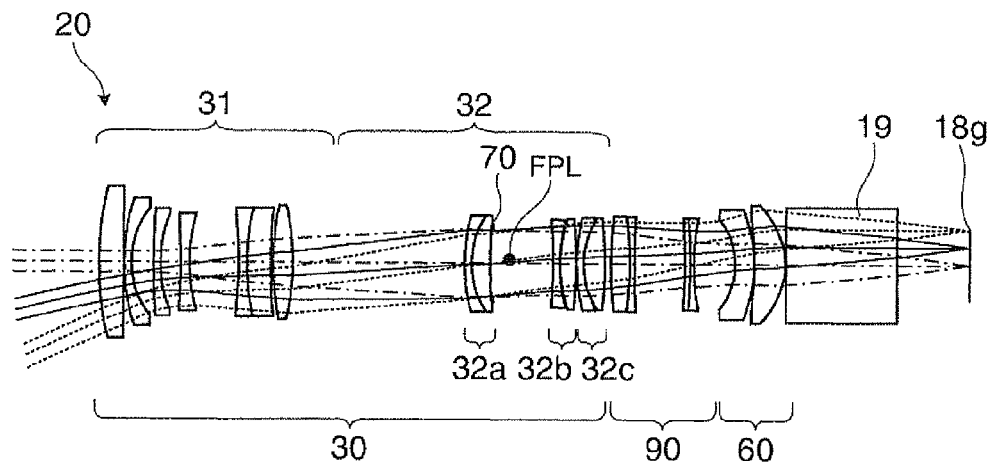
FIGS. 15A to 15C are views illustrating the zooming operation of the optical system in the second operating state of the Example 1 of the first embodiment.
Figure 15B:
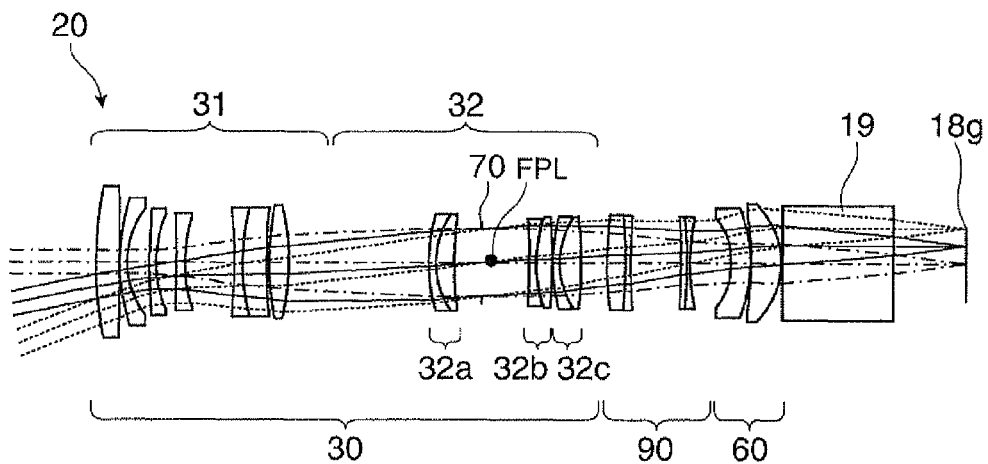
Figure 15C:
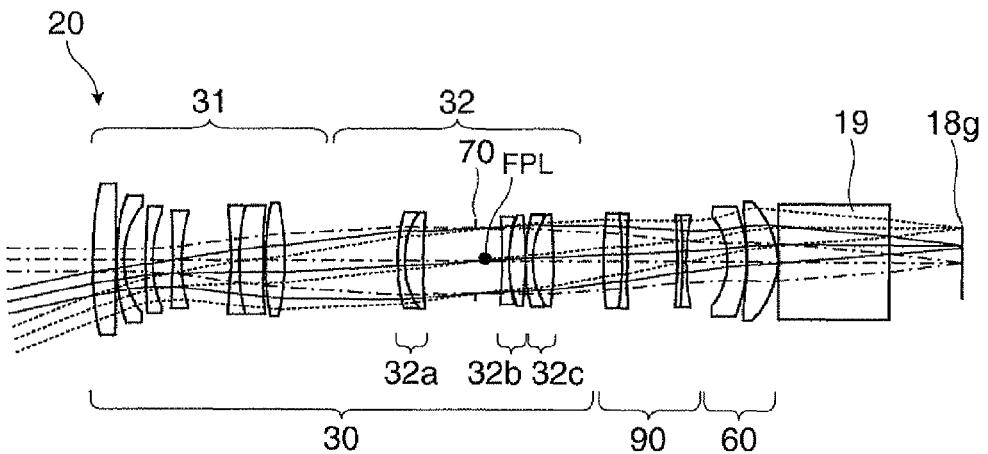

FIGS. 14A to 14C illustrate the zooming operation in the first operating state, and FIGS. 15A to 15C illustrate the zooming operation in the second operating state. FIG. 14A illustrates the state of FIG. 11 of the first operating state, and the case of a "wide end" in which a magnification power is large. Further, FIG. 14B illustrates the case of an "intermediate" state, and FIG. 14C illustrates the state of FIG. 10 and illustrates the case of a "tele end" in which a magnification power is small. In the same manner, FIG. 15A illustrates the case of a "wide end" in the second operating state, FIG. 15B illustrates the case of the "intermediate" state, and FIG. 15C illustrates the case of "tele end". As shown in the drawings, in association with the zooming operation, the position of the diaphragm 70 is changed. However, the diaphragm 70 is located between the focus FPy of the longitudinal section and the focus FPx of the lateral section, and arranged closer to the subject side, that is, a focus FPx side, than the intermediate position between the focus FPy of the longitudinal section and the focus FPx of the lateral section.

In the top columns of Table 3 and Table 4 below, the positions of each of the lens groups 32a, 32b, and 32c of the second lens unit 32 and the diaphragm 70, obtained when the zooming operations shown in FIGS. 14A to 14C and FIGS. 15A to 15C are performed, are displayed. In detail, the image side surface of the lens L8 of the lens group 32a is a thirteenth surface, the image side surface of the lens L10 of the lens group 32b is a sixteenth surface, and the image side surface of the lens L12 of the lens group 32c is a twenty-fourth surface.

TABLE 3

|  | Wide | Middle | Tele |
|---|---|---|---|
| 13 | 55.306 | 45.327 | 36.278 |
| 16 | 1.000 | 8.573 | 17.085 |
| Diaphragm | 19.319 | 15.113 | 8.417 |
| 24 | 2.000 | 8.611 | 15.845 |
| Focal distance | | | |
| fx | 21.300 | 23.400 | 25.600 |
| fy | 28.160 | 30.939 | 33.835 |
| Fno | | | |
| Fx | 3.09 | 3.18 | 3.28 |
| Fy | 4.08 | 4.21 | 4.35 |

Aspherical Coefficient

| Surface No. | K | A4 | A6 | A8 | A10 | A12 |
|---|---|---|---|---|---|---|
| 31 | 0.598 | −1.564E−05 | 6.172E−09 | −6.666E−11 | 1.871E−13 | −7.983E−16 |
| 32 | −5.055 | −9.449E−06 | 1.785E−08 | −1.685E−13 | −3.182E−14 | 3.498E−17 |

TABLE 4

|  | Wide | Middle | Tele |
|---|---|---|---|
| 13 | 55.306 | 45.327 | 36.278 |
| 16 | 1.000 | 8.573 | 17.085 |
| Diaphragm | 19.319 | 15.113 | 8.417 |
| 24 | 2.000 | 8.611 | 15.845 |
| Focal distance | | | |
| f | 24.329 | 26.726 | 29.243 |
| Fno | | | |
| F | 3.52 | 3.63 | 3.74 |

Aspherical Coefficient

| Surface No. | K | A4 | A6 | A8 | A10 | A12 |
|---|---|---|---|---|---|---|
| 31 | 0.598 | −1.564E−05 | 6.172E−09 | −6.666E−11 | 1.871E−13 | −7.983E−16 |
| 32 | −5.055 | −9.449E−06 | 1.785E−08 | −1.685E−13 | −3.182E−14 | 3.498E−17 |

In addition, the intermediate columns of Table 3 and Table 4 indicate the focal distances between the X direction and Y direction of the optical projection system 20 when the zooming operation is performed. Further, the bottom columns of Table 3 and Table 4 indicate the brightness (F value) in the X direction and Y direction of the optical projection system 20 when the zooming operation is performed.

Second Embodiment

Hereinafter, an optical projection system or the like according to a second embodiment will be described. In addition, the second embodiment is a modification example of the optical projection system or the like according to the first embodiment, and portions and items which are not especially described are the same as in the case of the first embodiment.

FIGS. 16A and 16B are views illustrating an optical projection system 20 according to the second embodiment. With respect to the section of the longitudinal direction (Y direction), the adjustment optical device group 240 included in the second group 245 of the optical projection system 20 includes a first optical device group 241 having negative power, and a second optical device group 242 having positive power in order from the screen SC. In this case, an image can be projected on the screen SC at an aspect ratio obtained by enlarging an image to be formed on the liquid crystal panel 18G (18R, 18B) in the longitudinal direction.

In the case of the optical projection system 20 shown in FIG. 16A or the like, generally, the focus FPy of the longitudinal section is closer to the liquid crystal panel 18G (18R, 18B) than the focus FPx of the lateral section, so that FFPy<FFPx. In this case, the distance FFPL in the second operating state is set in the range of Condition (1)'.

$$FFPy < FFPL < FFPx \quad (1)'$$

Therefore, the distance FFPL is greater than the lower limit FFPy and less than the upper limit FFPx. Further, the distance p is set in the range of Condition (2)'.

$$FFPy < p < FFPx \quad (2)'$$

Therefore, the distance p is greater than the lower limit FFPy and less than the upper limit FFPx. Therefore, it is possible to make telecentricity high in the second operating state while it is possible to make telecentricity high in both directions, that is, in the lateral direction and the longitudinal direction, in the first operating state.

Further, in the case of the optical projection system 20 shown in FIG. 16A or the like, the distance p is set within the range of Condition (3)'.

$$FFPy < p \leq (FFPy+FFPx)/2 \quad (3)'$$

Therefore, the distance p is greater than the lower limit FFPy and less than the upper limit (FFPy+FFPx)/2. Therefore, it is possible to make telecentricity comparatively high in the intermediate direction of the lateral direction and the longitudinal direction.

Third Embodiment

Hereinafter, an optical projection system or the like according to a third embodiment will be described. In addition, the third embodiment is the modification example of the optical projection system or the like according to the first embodiment, and portions and items which are not especially described are the same as in the case of the first embodiment.

FIGS. 17A and 17B are views illustrating the optical projection system 320 according to the third embodiment. The optical projection system 320 includes a first group 30 and a second group 45. The optical projection system 320 does not include a third group 60 as in the optical projection system 20 according to the first embodiment. In this case, the position of the diaphragm 70 is the distance between the focus of a lateral section and the focus of a longitudinal section based on the screen SC side end surface of an optical modulation device side lens group 20b. The distance p from the screen SC side end surface of the optical modulation device side lens group 20b to a diaphragm 70 is between the distance FFPy and the distance FFPx. Further, in the case of the optical projection system 320, the position of the diaphragm 70 is set to a range from the intermediate position, between the focus of the longitudinal section of the optical modulation device side lens group 20b and the focus of the lateral section, to the focal position on the side of a liquid crystal panel 18G (18R, 18B).

The configuration of the adjustment optical device group 40 shown in FIG. 17A or the like can be equal to the configuration of the adjustment optical device group 140 shown in FIG. 9A or the like. Further, the configuration of the adjustment optical device group 40 shown in FIG. 17A or the like can be equal to the configuration of the adjustment optical device group 240 shown in FIG. 16A or the like.

In the optical projection system 320 according to the third embodiment, it is possible to add a lens group having positive power to the adjustment optical device group 40.

The invention is not limited to the above-described embodiments, and can be implemented using various types of embodiments without departing from the gist of the invention.

In the above-described embodiments, if FFPx<FFPy, the following case is considered.

$$FFPx < p \leq (FFPy+FFPx)/2 \quad (3)$$

Meanwhile, with respect to the distance FFPL, the following case is considered.

$$FFPL \approx (FFPy+FFPx)/2 \quad (4)$$

For example, when these are combined, the distance FFPL is substantially equal to (FFPy+FFPx)/2 while the distance p is equal to or less than (FFPy+FFPx)/2, so that it can be considered that the distance FFPL is almost greater than the distance p. However, for example, by appropriately adjusting the power of the rotationally symmetric lens group 90, the value of the distance p is close to the value of distance FFPL, so that it is possible to further reduce the directional bias of telecentricity in the second operating state. However, it is actually necessary to consider the aberration or the like of the lens, and, in addition, the value of p is close to the value of FFPL if possible.

Further, it is not necessary to construct the adjustment optical device group 40 using only the rotationally asymmetrical optical device groups 41 and 42, and an asymmetrical optical device group can be added to the adjustment optical device group 40.

Further, although the position of the diaphragm 70 is changed in accordance with the zooming operation, the position of the diaphragm 70 is not changed and maintains a fixed state in, for example, the first operating state and the second operating state shown in FIGS. 7A to 7C. However, in addition to the change in accordance with the zooming operation, the change of the position of the diaphragm 70 may be implemented by switching it in a stepwise manner in the first operating state and the second operating state based on the relationship with each of the focuses FPx, FPy, and FPL, thereby further increasing telecentricity. For example, when the drive mechanism 61 has a structure with which two cam mechanisms are combined, two types of operations, that is, a continuous operation in accordance with the zooming operation and a stepwise operation in accordance with the change of the first operating state for the second operating state, can be performed with respect to the change in the position of the diaphragm 70.

The liquid crystal panels 18G, 18R, and 18B are not limited to the transmission type and can be a reflective type. Here, "the transmission type" means that the liquid crystal panel passes modulated light therethrough, and the "reflective type" means that the liquid crystal panel reflects modulated light thereon.

Although various colors of images formed on the plurality of liquid crystal panels 18G, 18R, and 1813 are combined with each other in the above-described projector 2, an image formed on a certain color or monochrome liquid crystal panel, which is a single optical modulation device, can be enlarged and then projected using the optical projection system 20. In this case, since the cross dichroic prism 19 is not necessary, the degree of freedom of the optical design of the optical projection system 20 is greater.

As the projector, there are a front projector in which image projection is performed from a direction in which a surface to be projected is observed, and a rear projector in which image projection is performed from a direction which is opposite to the direction in which a surface to be projected is observed. However, the projector shown in FIG. 2 or the like can be configured with either of them.

Instead of the liquid crystal panels 18G, 18R, and 1813, a digital micro mirror device or the like, which uses a micro mirror as a pixel, can be used as the optical modulation device.

The entire disclosure of Japanese Patent Application No. 2011-148000, filed Jul. 4, 2011 is expressly incorporated by reference herein.

What is claimed is:

1. An optical projection system which, when an image is enlarged and projected on a surface, makes an aspect ratio of an image of an optical modulation device different from an aspect ratio of the image projected on the surface, the optical projection system comprising:
    a diaphragm which restricts a passage of light flux; and
    an optical modulation device side lens group which is arranged between the optical modulation device and the diaphragm, configured to include an adjustment optical device group which has different powers in a longitudinal direction and a lateral direction of the optical modulation device and which is capable of advancing and retracting on an optical path, and a rotationally symmetric lens group which includes one or more rotationally symmetrical lenses, which have same power in the longitudinal direction and the lateral direction of the optical modulation device and which is capable of advancing and retracting on the optical path,
    wherein, when one of the adjustment optical device group and the rotationally symmetric lens group of the optical modulation device side lens group is arranged on an optical path, a remaining group is withdrawn from the optical path, so that a state in which the adjustment optical device group is on the optical path can be interchanged with a state in which the rotationally symmetric lens group is on the optical path, and
    wherein, when it is assumed that a distance between a combined focus of the lateral section of the optical modulation device side lens group on a side of the surface to be projected on and an end surface on the side of the surface to be projected on is set to "FFPx" in a lateral section of the optical modulation device side lens group in the state in which the adjustment optical device group is arranged on the optical path, a distance between a combined focus of the longitudinal section of the optical modulation device side lens group on the side of the surface to be projected on and the end surface on the side of the surface to be projected on is set to "FFPy" in a longitudinal section of the optical modulation device side lens group in the state in which the adjustment optical device group is arranged on the optical path, and a distance between a combined focus of the optical modulation device side lens group on the side of the surface to be projected on and the end surface on the side of the surface to be projected on is set to "FFPL" in the optical modulation device side lens group in the state in which the rotationally symmetrical lens group is arranged on the optical path, FFPx, FFPy, and FFPL satisfy the following expressions, $FFPx < FFPL < FFPy$ if $FFPx < FFPy$, and $FFPy < FFPL < FFPx$ if $FFPy < FFPx$.

2. The optical projection system according to claim 1, wherein, when it is assumed that a distance between the diaphragm and the end surface on the side of the surface to be projected on in the optical modulation device side lens group is "p" in the state in which the adjustment optical device group is arranged on the optical path, p satisfies the following expressions, $FFPx < p < FFPy$ if $FFPx < FFPy$, and $FFPy < p < FFPx$ if $FFPy < FFPx$.

3. The optical projection system according to claim 2, wherein, in the state in which the adjustment optical device group is withdrawn from the optical path, the distance p, between the diaphragm and the end surface on the side of the surface to be projected on in the optical modulation device side lens group, is substantially equal to the distance FFPL between the focus on the side of the surface to be projected on in the optical modulation device side lens group and the end surface on the side of the surface to be projected on 0.

4. The optical projection system according to claim 2, wherein $FFPx < p(FFPy + FFPx)/2$ if $FFPx < FFPy$, and wherein $FFPy < p(FFPy + FFPx)/2$ if $FFPy < FFPx$.

5. The optical projection system according to claim 1, in order from the side of the surface to be projected on, further comprising:
    a first group which performs enlargement;
    a second group which includes the adjustment optical device group and the rotationally symmetric lens group which are alternatively arranged on the optical path; and
    a third group having positive power.

6. The optical projection system according to claim 1, in order from the side of the surface to be projected on, further comprising:
    a first group which performs enlargement; and
    a second group which includes the adjustment optical device group and the rotationally symmetric lens group which are alternatively arranged on the optical path.

7. The optical projection system according to claim 1, wherein the adjustment optical device group includes, in order from the side of the surface to be projected on, a first optical device group having positive power and a second optical device group having negative power in a section of the longitudinal direction of the optical modulation device.

8. The optical projection system according to claim 7, wherein the rotationally symmetric lens group corresponds to each of the optical device groups of the adjustment optical device group, and includes, in order from the side of the surface to be projected on, a first optical device group having positive power and a second optical device group having negative power.

9. The optical projection system according to claim 1, wherein the adjustment optical device group includes, in order from the side of the surface to be projected on, a first optical device group having negative power and a second optical device group having positive power in a section of the lateral direction of the optical modulation device.

10. The optical projection system according to claim 9, wherein the rotationally symmetric lens group corresponds to each of the optical device groups of the adjustment optical device group, and includes, in order from the side of the surface to be projected on, a first optical device group having negative power and a second optical device group having positive power.

11. The optical projection system according to claim 7, wherein the rotationally symmetric lens group has power which ranges between the power of the adjustment optical device group in the section of the longitudinal direction of the optical modulation device and the power in the section of the lateral direction.

12. The optical projection system according to claim 1, further comprising:
a photonic synthesis prism which is arranged on the side of the optical modulation device of the optical modulation device side lens group.

13. A projector comprising:
the optical projection system according to claim 1; and
the optical modulation device.

14. A projector comprising:
the optical projection system according to claim 2; and
the optical modulation device.

15. A projector comprising:
the optical projection system according to claim 3; and
the optical modulation device.

16. A projector comprising:
the optical projection system according to claim 4; and
the optical modulation device.

17. A projector comprising:
the optical projection system according to claim 5; and
the optical modulation device.

18. A projector comprising:
the optical projection system according to claim 6; and
the optical modulation device.

19. A projector comprising:
the optical projection system according to claim 7; and
the optical modulation device.

20. A projector comprising:
the optical projection system according to claim 8; and
the optical modulation device.

* * * * *